(12) United States Patent
Klase et al.

(10) Patent No.: US 9,060,468 B2
(45) Date of Patent: Jun. 23, 2015

(54) PLANT GROWTH LIGHTING DEVICE AND METHOD

(75) Inventors: Nicholas Peter Klase, Austin, TX (US); Dung T. Duong, Bee Cave, TX (US); Emil Radkov, Kyle, TX (US); Paul N. Winberg, Hot Springs Village, AR (US)

(73) Assignee: ILLUMITEX, INC., Austin, TX (US)

( * ) Notice: Subject to any disclaimer, the term of this patent is extended or adjusted under 35 U.S.C. 154(b) by 580 days.

(21) Appl. No.: 13/404,907

(22) Filed: Feb. 24, 2012

(65) Prior Publication Data

US 2012/0218750 A1 Aug. 30, 2012

Related U.S. Application Data

(60) Provisional application No. 61/446,881, filed on Feb. 25, 2011.

(51) Int. Cl.
*A01G 7/04* (2006.01)
*F21V 5/00* (2015.01)
*F21Y 101/02* (2006.01)
*F21Y 113/00* (2006.01)

(52) U.S. Cl.
CPC .............. *A01G 7/045* (2013.01); *F21V 5/007* (2013.01); *F21Y 2101/02* (2013.01); *F21Y 2113/005* (2013.01)

(58) Field of Classification Search
USPC ............ 362/227, 228, 230, 234, 249.02, 800, 362/805
See application file for complete search history.

(56) References Cited

U.S. PATENT DOCUMENTS

| 5,012,609 | A | 5/1991 | Ignatius et al. |
| 6,921,182 | B2 * | 7/2005 | Anderson et al. ............. 362/231 |
| 7,520,642 | B2 * | 4/2009 | Holman et al. ............... 362/328 |
| 8,523,385 | B2 * | 9/2013 | Lu et al. ........................ 362/231 |
| 8,568,009 | B2 * | 10/2013 | Chiang et al. ................. 362/563 |
| 2004/0230102 | A1 | 11/2004 | Anderson |
| 2005/0281027 | A1 | 12/2005 | Capen et al. |
| 2008/0302004 | A1 | 12/2008 | Lin |
| 2009/0199470 | A1 | 8/2009 | Capen et al. |
| 2010/0277078 | A1 | 11/2010 | Morton |
| 2010/0287830 | A1 | 11/2010 | Chen et al. |

FOREIGN PATENT DOCUMENTS

WO WO 2010/010540 1/2010

OTHER PUBLICATIONS

International Preliminary Report on Patentability issued for PCT Application No. PCT/US2012/026586, mailed Sep. 6, 2013, 8 pages.
Product Specifications, Surexi Horticulture LEDs, Illumitex, Inc., Austin, TX, 2011, 2 pgs.
Illumitex Plant Growth LEDs, Horticulture Lighting, The Science of Plant Growth, Surexi Horticulture LED Series by Illumitex, Illumitex, Inc., Austin, TX, Jul. 2011, 1 pg.

(Continued)

*Primary Examiner* — John A Ward
(74) *Attorney, Agent, or Firm* — Sprinkle IP Law Group

(57) ABSTRACT

Embodiments described herein provide systems and methods for promoting plant growth that combine beam angle control with spectral control. In one embodiment, an optical device can be configured to emit multiple colors of light at particular wavelengths. The optical device may also be configured to generate an emission spectrum with multiple peaks. The spectrum can be selected based on stimulating biological processes of a plant.

33 Claims, 14 Drawing Sheets

(56) References Cited

OTHER PUBLICATIONS

Illumitex LED Technical Data Sheet, Surexi Growth LEDs Horticulture Light F1 Growth Spectrum, Illumitex, Inc., Austin, TX, 2009, 11 pgs.
Product Specifications, Abeo FX44 LEDs, Illumitex, Inc., Austin, TX, 2011, 2 pgs.
Whitmarsh, John, et al., The Photosynthetic Process, In: "Concepts in Photobiology: Photosynthesis and Photomorphogenesis," Edited by GS Singhal, et al., Narosa Publishers, New Delhi; and Kluwer Academic, Dordrecht, 29 pgs.
Photosynthesis, 2010, retrieved from <<http://faculty.clintoncc.suny.edu/faculty/michael.gregory/files/bio%20101/bio%20101%20lectures/photosynthesis/photosyn.htm>>, 19 pgs.
Effect of Short-Wavelength Light on Plant Physiology, Apr. 16, 2010, retrieved from <<http://www.lightinglab.fi/enlighten/publications/internetui_akvile.pdf>>.
Spalding, E.P. and Folta, K.M., Illuminating topics in plant photobiology, Plant, Cell and Environment Journal vol. 28, Issue 1, Jan. 2005, Blackwell Publishing Ltd., 15 pgs.
Sellaro, Romina et al., Cryptochrome as a Sensor of the Blue/Green Ratio of Natural Radiation in Arabidopsis, Plant Physiology, Sep. 2010, vol. 154, pp. 401-409.
Folta, Kevin M. and Maruhnich, Stefanie A., Green Light: a signal to slow or stop, Journal of Experimental Botany, vol. 58, No. 12, pp. 3099-3111, 2007.
Zhang, Tingting et al., Green Light Induces Shade Avoidance Symptoms, Plant Physiology, Nov. 2011, vol. 157, pp. 1528-1536.
Jiao, Yuling et al., Light-Regulated Transcriptional Networks in Higher Plants, Nature Reviews Genetics vol. 8, No. 3, Mar. 2007, pp. 217-230.
Chalker-Scott, Linda, Basic Environmental Photobiology, Mar. 24, 2010, 8 pgs. Washington State University, Puyallup, WA, retreived from <<http://www.photobiology.info/Chalker-Scott.html>>.
Kretschmer, Fabian and Kollenberg, Malte E., Can Urban Agriculture Feed a Hungry World? Spiegel Online International, Jul. 22, 2011, 1 pg., retrieved from <<http://www.spiegel.de/international/zeitgeist/vertical-farming-can-urban-agriculture-feed-a-hungry-world-a-775754.html>>.
Vertical Farming—Does it Really Stack Up? The Economist, Dec. 9, 2010, 7 pgs. retrieved from <<http://www.economist.com/node/17647627>>.
Vertical Farming—Wikipedia, Jan. 26, 2012, 14 pgs. retrieved from <<http://en.wikipedia.org/wik/Vertical_farming>>.
Folta, Kevin, Green Light Effects on Plant Growth and Development, Oct. 4, 2007, University of Cambridge, UK, retrieved from <<http://talks.cam.ac.uk/talk/index/8074>>.
Folta, Kevin M., Green Light Stimulates Early Stem Elongation, Antagonizing Light-Mediated Growth Inhibition, Plant Physiology, Jul. 2004, vol. 135, pp. 1407-1416.
International Search Report and Written Opinion of the International Search Authority for International Patent Application No. PCT/US12/26586, mailed Jun. 29, 2012, 9 pgs.

* cited by examiner

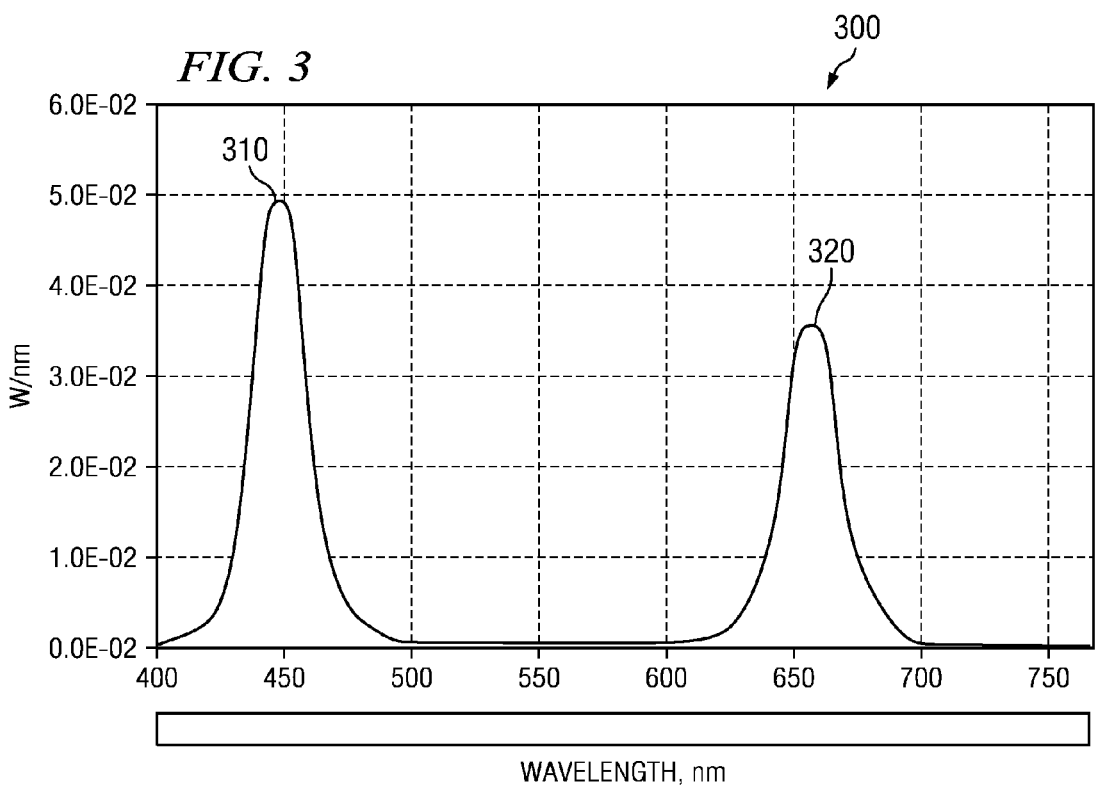
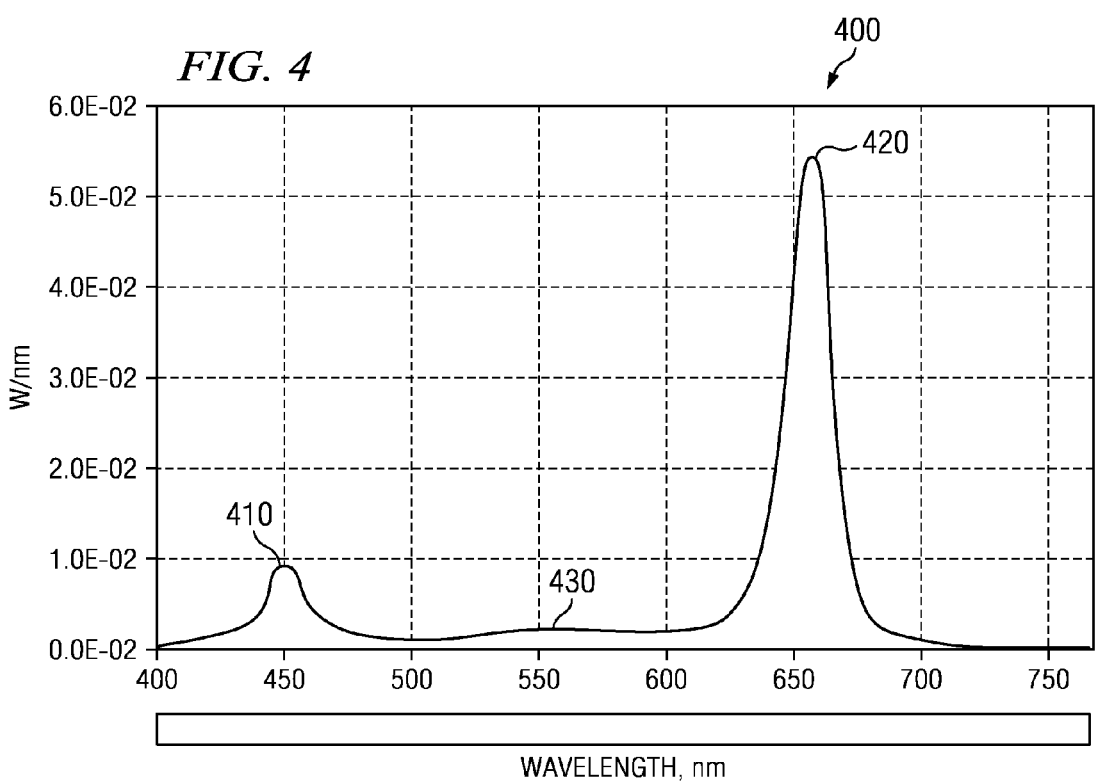

PLANT GROWTH LIGHTING DEVICE AND METHOD

RELATED APPLICATIONS

This application claims priority under 35 U.S.C. 119(e) to U.S. Provisional Patent Application No. 61/446,881 entitled "Plant Growth Lighting System and Method" by Klase et al., filed Feb. 25, 2011, which is hereby fully incorporated by reference.

TECHNICAL FIELD OF THE DISCLOSURE

The present disclosure relates generally to LED lighting suitable for a wide range of plant-growing applications, e.g. algal cultures, tissue cultures, germination and growth chambers, green houses, vertical farms, supplemental lighting in such facilities and the like. More particularly, the present disclosure relates to the using LEDs configured to emit light at particular wavelengths to enhance plant growth.

BACKGROUND OF THE DISCLOSURE

Population growth, natural and other events have stimulated the farming industry to seek technological advances in raising crops. Studies indicate by the year 2050 there may be 9 billion people inhabiting the earth. Given the limited area of land in relation to population growth, agricultural productivity is limited. As a result, solutions to assist with limited crop productivity are given consideration. One such area of interest is the field of vertical farming. In vertical farming, buildings may be used to grow crops that may not be otherwise grown on land.

Growing crops within buildings and vertical farms require the usage of powered lighting to provide essential light for plants growing within buildings. These "plant" lights or "grow" lights may be electrically powered lights that emit a spectrum of lights used for photosynthesis. Examples of various "plant" light sources include metal halide light, fluorescent light, high-pressure sodium light, incandescent light and LEDs (light emitting diode).

The vast majority of these lights were made to maximize the lumen content or tailored toward the human eye response, the photopic response. Plants generally do not respond optimally to the human photopic vision curve, which emphasizes green light. Photosynthetic chlorophylls, and other accessory pigments, respond better to blue and red light. Green light is mainly reflected from plants and so plants tend to exhibit various ranges of the color green.

LED lights in particular have peaked interest in growing indoor crops as LEDs provide for bright, cost-effective and long lasting light that can emit various wavelengths of light that encourage the photosynthetic process in plants. In addition to vertical farms, LED lighting suitable for a wide range of plant-growing applications, e.g. algal cultures, tissue cultures, germination and growth chambers, green houses, aquatic plants, supplemental lighting in such facilities and the like. Given the stimulating response to red and blue light to plant growth, current LED products for horticulture lighting focus primarily on the blue and red spectrum.

SUMMARY

Embodiments described herein provide systems and methods for stimulating plant growth. In general, plants can be stimulated with selected spectrum of light to promote particular biological processes. A spectrum of light, according to one embodiment, may include emission peaks in multiple color regions to promote various processes. Spectral control can be combined with beam control to provide a highly efficient system for stimulating plant growth.

One embodiment disclosed herein can include a system for plant growth that comprises a first LED device configured to emit light of a first color with a controlled beam angle of any desired half angle (e.g., a half angle of less than or equal to 60 degrees, less than or equal to 45 degrees, less than or equal to 30 degrees, less than or equal to 15 degrees) and a second LED device configured to emit light of a second color with a controlled half angle. The system can be configured to generate an emission spectrum having a first emission peak below 500 nm and a second emission peak above 600 nm. The system may also include additional LED devices (e.g., a third LED device configured to emit light of a third color).

Another embodiment can comprise a method of illuminating plants that includes providing a system comprising i) a first LED device configured to emit light of a first color with a controlled beam angle (e.g., a beam half angle of less than or equal to 60 degrees, 45 degrees, 30 degrees or 15 degrees) and a second LED device configured to emit light of a second color with a controlled half angle. The method can further include illuminating plants using the system to generate an emission spectrum having a first emission peak below 500 nm and a second emission peak above 600 nm.

According to one embodiment, the emission spectrum can have a first emission peak at 425-475 nm and a second emission peak at 635-685 nm. The spectrum may also have a third emission peak at 500-600 nm. The emission spectrum may have various amounts of red, green, blue and far red light. In one embodiment, the photon flux of the emission spectrum contains 5-30% green light and 5-30% blue light. By way of example, but not limitation, the photon flux of the emission spectrum may contain between 5% and 10% green light and between 10% and 15% blue light. In another embodiment, the photon flux of the emission spectrum may contain between 10% and 15% green light and between 5% and 30% blue light. In yet another embodiment, the photon flux of the emission spectrum may contain between 20% and 30% green light and between 5% and 30% blue light.

One embodiment disclosed herein can include a system for plant growth comprising a first LED device configured to emit light of a first color, wherein the first LED device is configured to emit at least 65% light in beam in a beam angle of less than or equal to 60 degrees and a second LED device configured to emit light of a second color, wherein the first LED device is configured to emit at least 65% light in beam in a beam angle of less than or equal to 60 degrees. The system can be adapted to generate an emission spectrum having a first emission peak below 500 nm and a second emission peak above 600 nm.

Another embodiment can include a method comprising emitting a first color with a first LED device with a first radiant power, emitting a second color with a second LED device with a second radiant power and illuminating a plant with light having a spectrum formed at least in part by light from the first LED and the second LED, wherein the spectral distribution has a first emission peak below 500 nm and a second emission peak above 600 nm and wherein a majority of the irradiance falls outside of the red region.

Yet another embodiment can include a method comprising emitting a first color with a first LED device, emitting a second color with a second LED device and illuminating a plant with light having a spectrum formed at least in part by light from the first LED and the second LED, wherein the emission spectrum has at least one emission peak above 600 nm and at least one emission peak below 600 nm. According to one embodiment, a majority of the irradiance falls outside of the red region.

One advantage to embodiments disclosed herein is that color and spectra may be custom selected to provide for species-specific plant growth. This may assist in maximizing plant growth through a species-specific plant growth cycle.

Another advantage of embodiments disclosed herein is that light beam pattern control and color blending can be achieved at the same optical device for plant growth. Providing for light beam pattern control ensures that a desired amount of light is emitted to targeted plants with minimal wastage of light. Color blending helps to ensure that plants will develop and grow optimally. By providing for both light beam pattern control and color blending, embodiments disclosed herein may ensure that maximal plant growth occurs under the most desired and advantageous conditions.

Another advantage that may be provided by embodiments described herein is that the emission spectrum can be dynamically controlled to change by the time of day, month or year or to change with the plant growth cycle.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 1-9 are diagrammatic representations of different embodiments of emission spectra with at least two emission peaks;

DETAILED DESCRIPTION

Figure 1:
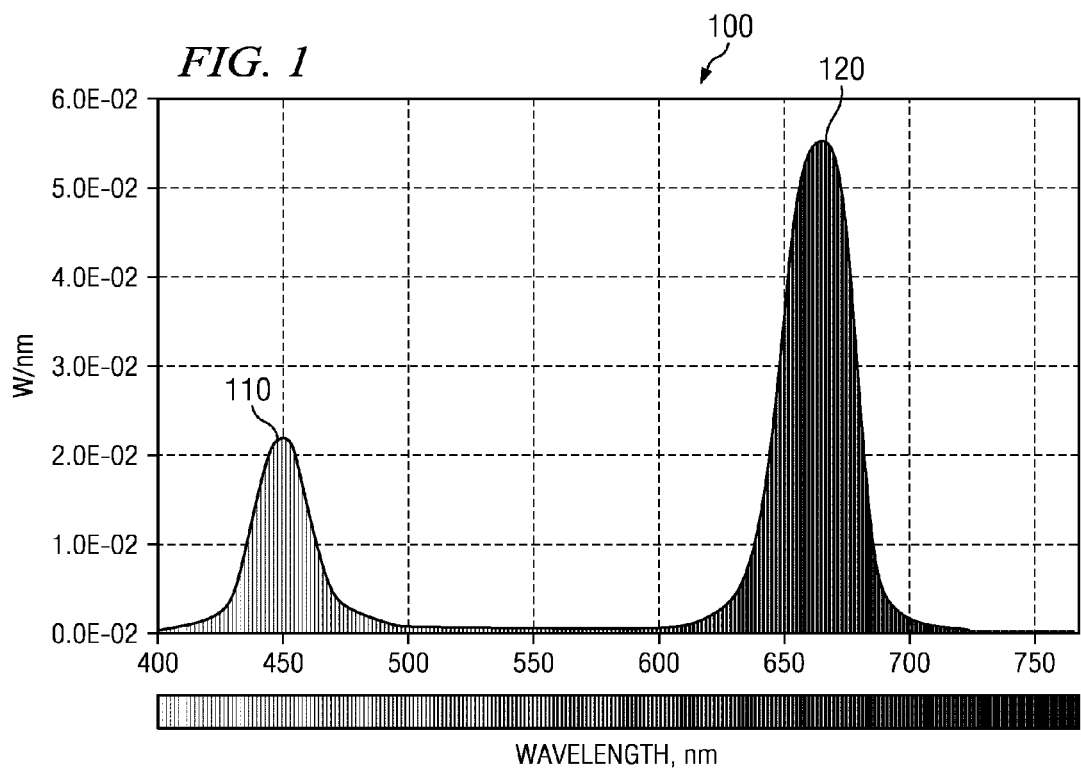

Embodiments and various features and advantageous details thereof are explained more fully with reference to the exemplary, and therefore non-limiting, examples illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments of the disclosure, examples of which are illustrated in the accompanying drawings. Wherever possible, like numerals will be used throughout the drawings to refer to like and corresponding parts (elements) of the various drawings.

By studying the response of algal cultures, tissue cultures, cyanobacteria cultures and plants to various light spectra, it is possible to alter the growth characteristics of these cultures and plants with specific wavelength spectra. Depending on a customer's described needs, LEDs can utilize different chips and phosphors to create light content custom-tailored to specific species of plants. As discussed above, arrays of LEDs can be configured to achieve the various spectra (e.g., through selection of phosphors and LEDs). In some cases, the LEDs can be controlled so that the spectrum shifts dynamically. The various spectra can be used to alter biochemical processes such as photosynthesis and/or photomorphogenesis responses of a target plant. Photomorphogenic processes may include changes in a plant's biochemical, physiological, and molecular makeup that may guide a plant developmentally.

Prior studies have noted different photosynthesis and photomorphogenesis response rates on a species-to-species basis. Hence, LED packages can be customized to meet each plant's specific requirements. By using packaged LED with the customized spectra as discussed above, embodiments describe herein can use controlled light to alter the vitamin, salt, acid, antioxidant, flavonoid, carotenoid, chloroplast and accessory pigment levels within the target plant. This may be useful in conditions where a supplement to daylight is needed for plant growth.

Embodiments describe herein look to optimize spectrum for light provided to plants. LEDs offer a wide variety of spectra from AlGaN (UV), InGaN (blue and green), AlInGAP (reds), to AlGaAs (NIR). The opportunity also exists to add specific phosphor blends to the high energy Blue and UV LEDs to create any spectra. LEDs offer an efficient light source to deliver specific spectra to plants to maximize the specific growth characteristics. The device can allow for a custom plant-specific selection of LED lights at a particular color and at a particular wavelength to encourage optimal growth for selected plant species.

Lighting with various spectra can display various emission peaks at different wavelengths. Such a distribution can be custom selected for a particular plant species. Peaks for spectral distributions may present intensity at various wavelengths that may be useful in facilitating biochemical processes for plant growth. For the purposes of this discussion, the ultraviolet region of the spectrum occurs below 400 nm, the blue region of the spectrum occurs between 400 and 499 nm, the green region occurs between 500 and 599 nm, the red region occurs between 600 and 699 nm, and the far red region occurs above 700 nm. Similarly, an ultraviolet LED has a peak emission wavelength below 400 nm, a blue LED has a peak emission wavelength between 400 and 499 nm, the green LED has a peak emission wavelength between 500 and 599 nm, a red LED has a peak emission wavelength between 600 and 699 nm, and a far red LED has a peak emission wavelength above 700 nm and preferably from 720-740 nm.

Embodiments of the present application can apply light having emission peaks in various wavelengths. The emission peaks at some wavelengths may be greater than the emission peaks at other wavelengths depending on the spectrum. Thus, for example, a spectrum may have a strong emission peak in the blue region and a weaker emission peak in the red region or vice versa. Depending on the application, the spectrum applied can have emission peaks in two or more regions, though certain devices can also provide spectra with emission peaks in a single region. Furthermore, a spectrum may have multiple emission peaks in a single region. In general, the photon flux for the regions ultraviolet (uv), blue (b), green (g), red (r) and far red (fr) adheres to uv+b+g+r+fr=100%. Preferably, b≥10% and r≤50% for general applications. For other applications, r may be less than 50%. Different spectra may be used to stimulate different plants to optical effect.

FIGS. 1-11 provide various examples of spectra that can be delivered to plants. In the following examples, the x-axis represents wavelength and the y-axis represents flux. FIG. 1 depicts one example of a spectral distribution having an emission peak in the blue region and an emission peak in the red region. Peak 110 occurs at 450 nm+/−25 nm, the blue region, and peak 120 occurs at about 660 nm+/−25 nm, or the red region. Spectral distribution 100 may be useful for aiding a plant species throughout a growth cycle. In this embodiment, a strong emission peak in the red region may encourage photosynthesis during a vegetative growth stage and facilitate the flowering stage. The emission peak in the blue region is useful in controlling plant height. It can also be seen that the integrated flux is distributed almost entirely between the blue and red regions with very little coming from green, ultraviolet or far red.

Figure 2:
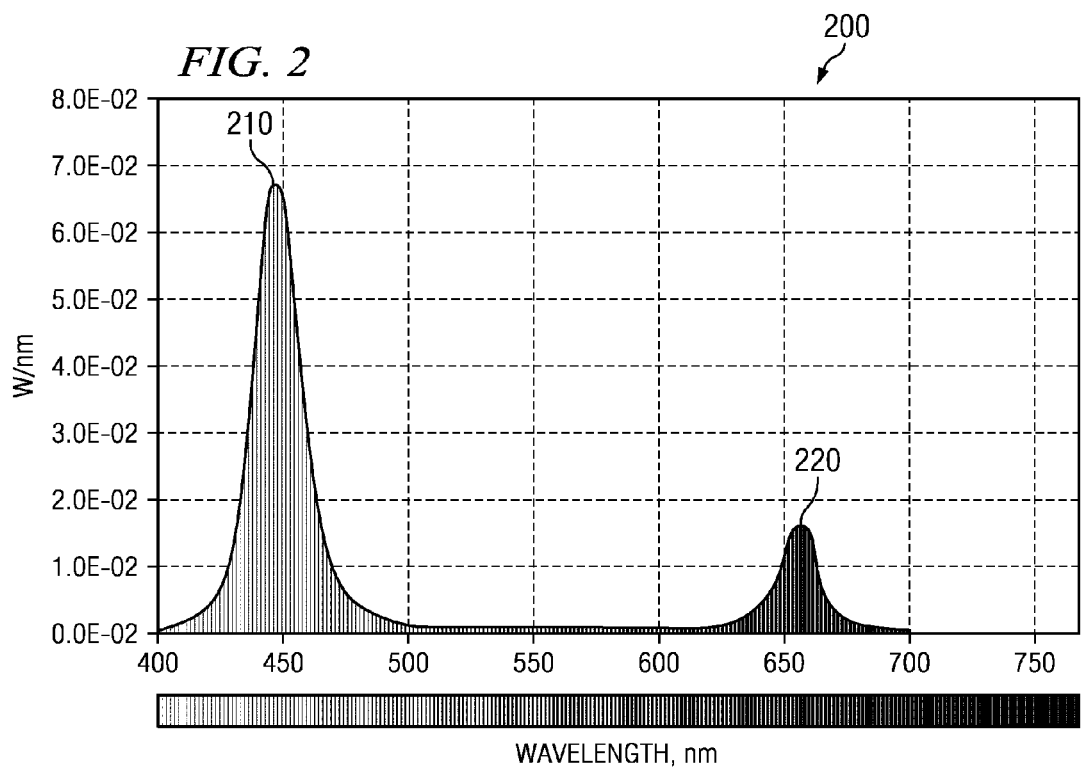

FIG. 2 depicts another example of a spectral distribution 200 having two emission peaks, one in the blue region and one in the red region. Peak 210 occurs at around 450 nm+/−25 nm, the blue region, and peak 220 occurs at around 660 nm+/−25 nm, or the red region. Spectral distribution 200 has a strong emission of "blue" light that may be useful in producing stocky plants with short intermodal distances. Such a spectral distribution may be desirable at a seedling stage prior to transplantation. A smaller emission peak in the red region may assist to facilitate growth. It can also be seen that the integrated flux is distributed almost entirely between the blue and red regions with very little coming from green, ultraviolet or far red.

FIG. 3 depicts an example spectral distribution 300 having two emission peaks, one in the red region and one in the blue region. In this example, peak 310 occurs at approximately 450 nm+/−25 nm, the blue region, and peak 320 occurs at approximately 660 nm+/−25 nm, or the red region. In this spectral distribution, there is an intense blue region at peak 310 that may provide for fast vegetative growth results. An intense blue region may reduce plant height and improve plant appearance and utilization. This may be useful in the production of leafy green vegetables. An emission in the red region may facilitate vegetative growth. Again, it can be seen that the integrated flux is distributed almost entirely between the blue and red regions with very little coming from green, ultraviolet or far red.

It can be further noted that the example spectra of FIGS. 1-3 have only two distinct emission peaks in the visible light region, a single peak in the blue region and a single peak in the red region. According to one embodiment, the flux in the red region can be greater than, less than or equal to the flux in the blue region. For example, the flux from light in the red region can be more than twice that or less than half of that provided from light in the blue region.

FIG. 4 depicts another example of a spectral distribution. In this example, spectral distribution 400 has three distinct emission peaks in the visible spectrum, one in the blue region, one in the red region and one in the green region. Peak 410 occurs at approximately 450 nm+/−25 nm, the blue region, emission peak 420 occurs at approximately 660 nm+/−25 nm, or the red region, and emission peak 430 occurs at approximately 550 nm+/−50 nm, in the green region. In spectral distribution 400, a light emission in the red region may produce fast germination for plant species where germination requires light. A peak in the blue region may help to reduce plant height. A peak in the green region may assist in regulating aspects of plant physiology and assist accessory pigments in producing biochemical products. In the specific example shown in FIG. 4, the green light is about 8%, the blue light—about 12% of the total photon flux, with the balance in the red/far red spectral region, with a negligible amount of far red (less than 2%). Generally, though not necessarily, the amount of blue light is increased as height elongation is to be decreased. Preferably, in this example, the amount of green light is in the 5-10% range and the amount of blue light is within the 5% to 30% range.

Figure 5:
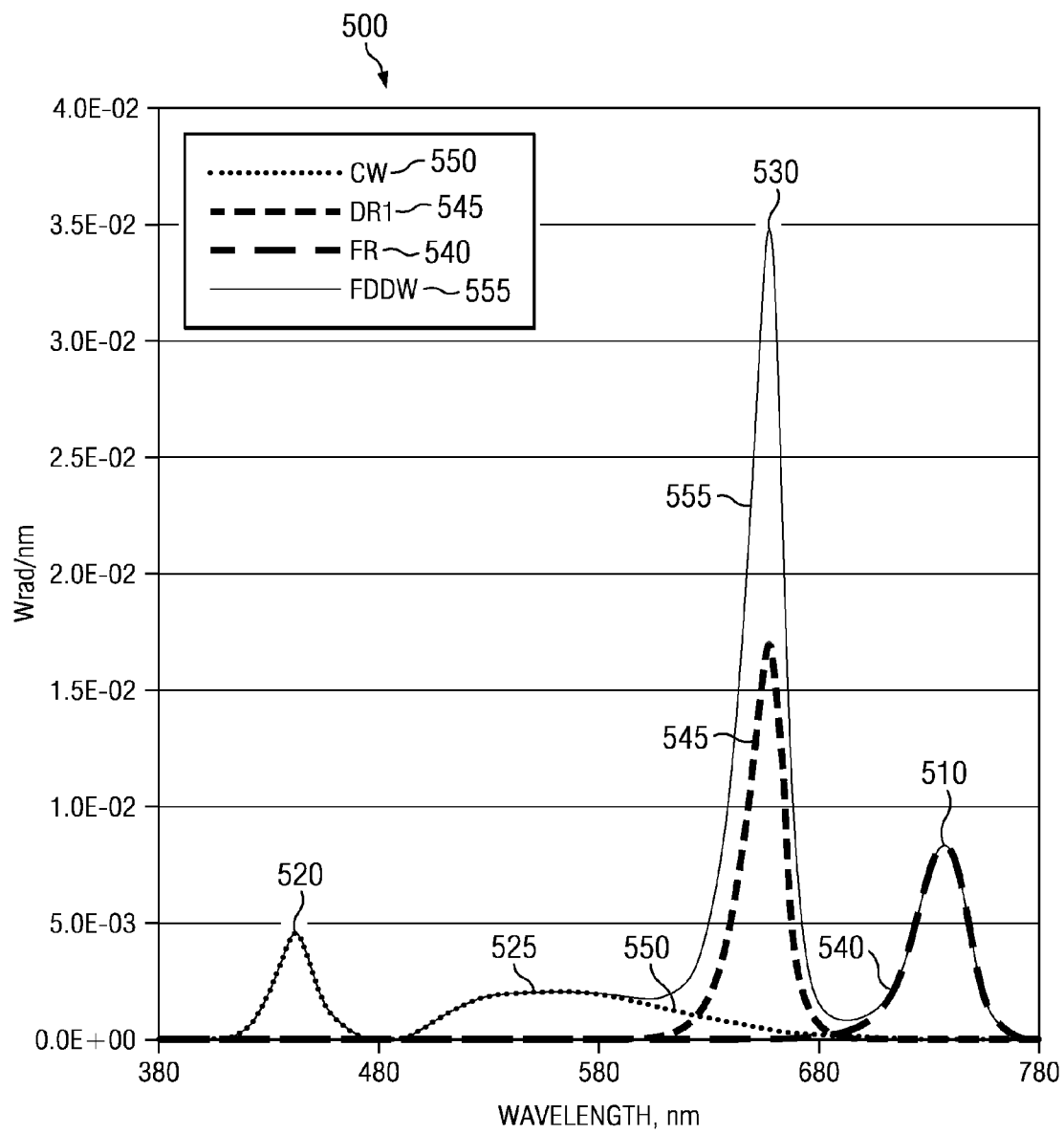

FIG. 5 depicts another example of a spectral distribution 500 with four distinct emission peaks in the visible spectrum: peak 520 in the blue region; peak 525 in the green region; peak 530 in the red region and peak 510 in the far red region. The spectrum can be achieved by mixing light having an emission peak in the far red region, cool white light having emission peaks and in the blue and green regions, respectively, light having an emission peak in the red region and light having an emission peak in the far red region. By way of example, but not limitation, the spectrum of FIG. 5 can be achieved by using a ratio of 1 LED emitting with a peak emission wavelength in the far red region (e.g., 730 nm+/−25 nm) (represented by line 540); two LEDs emitting with emission peaks in the red region (e.g., 660 nm+/−25 nm) (represented by line 545); one LED emitting cool white light having emission peaks in the blue region (e.g., 450 nm+/−25 nm) and the green region (560 nm+/−25 nm) (represented by line 550) to create the overall emission spectrum represented by line 555.

Figure 6:
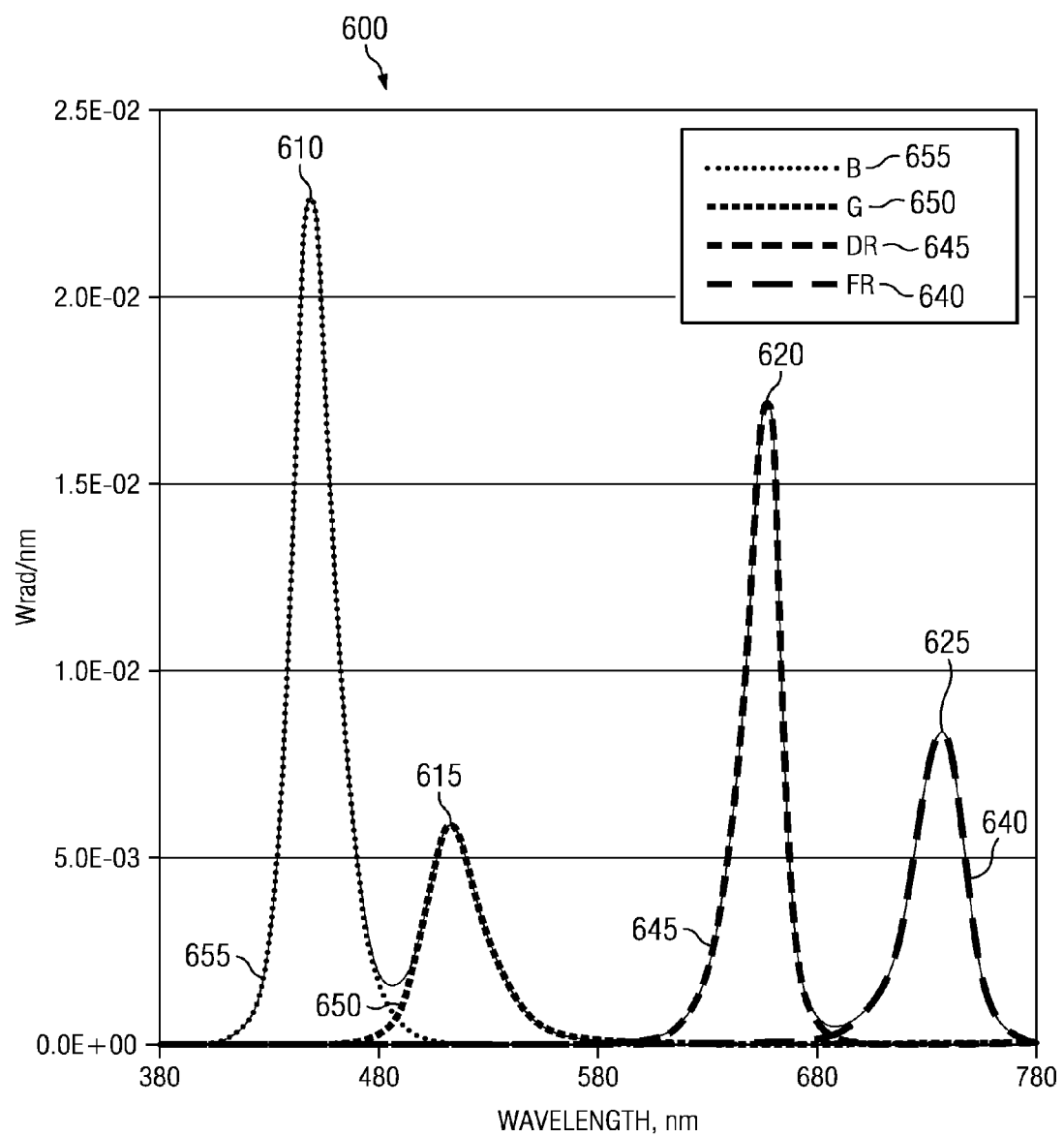

FIG. 6 depicts an example spectral distribution 600 with four distinct emission peaks in the visible spectrum: peak 610 in the blue region, peak 615 in the green region, peak 620 in the red region and peak 625 in the far red region. The spectrum can be achieved by mixing light having an emission peak in the far red region, light having an emission peak in the red region, light having an emission peak in the green region and light having an emission peak in the blue region. By way of example, but not limitation, the spectrum of FIG. 6 can be achieved by using a ratio of 1 LED emitting with a peak emission wavelength in the far red region (e.g., 730 nm+/−25 nm) (represented by line 640); one LED emitting with emission peaks in the red region (e.g., 660 nm+/−25 nm) (represented by line 645); one LED emitting light with an emission peak in the green region (e.g., 525 nm+/−25 nm) (represented by line 550) and one LED emitting light with an emission peak in the blue region (e.g., 450 nm+/−25 nm) (represented by line 555) to create the overall emission spectrum.

Figure 7:
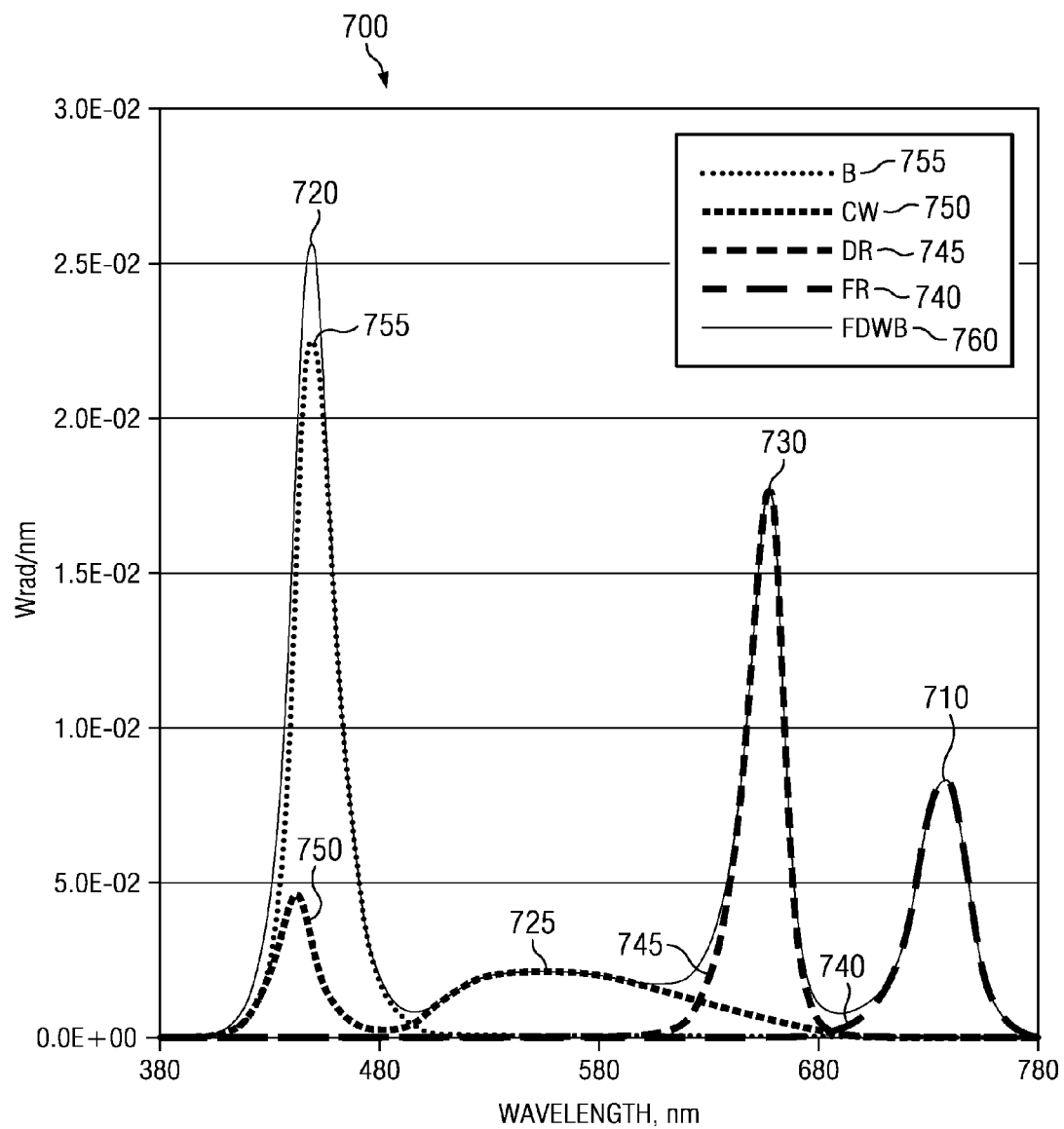

FIG. 7 depicts another example of a spectral distribution 700 with four emission peaks: peak 720 in the blue region; peak 725 in the green region; peak 730 in the red region and peak 710 in the far red region. The spectrum can be achieved by mixing light having an emission peak in the far red region, cool white light having an emission peaks and in the blue and green regions, respectively, light having an emission peak in the red region and light having an emission peak in the blue region. By way of example, but not limitation, the spectrum of FIG. 7 can be achieved by using a ratio of 1 LED emitting with a peak emission wavelength in the far red region (e.g., 730 nm+/−25 nm) (represented by line 740); one LED emitting with emission peaks in the red region (e.g., 660 nm+/−25 nm) (represented by line 745); one LED emitting "cool white" light having emission peaks in the blue region (e.g., 450 nm+/−25 nm) and the green region (550 nm+/−55 nm) (represented by line 750) and one LED emitting light having an emission peak in the blue region (e.g., 450 nm+/−25 nm) (represented by line 755) to create the overall emission spectrum represented by line 760. Contrasting FIGS. 5 and 7, it can be noted that the substitution of a blue light emitting device in the example of FIG. 7 for the second red emitting device of FIG. 5 significantly increases the intensity of the emission peak in the blue region while reducing the emission peak in the red region. As shown in the example of FIG. 7, the spectrum of this system can be configured to emit green light with a peak in the 550 nm+/−50 nm region without necessarily using green LED chips, e.g. by the use of blue chips coated with green emitting phosphor, referred to as "cool white above". Such phosphors are known in the art.

Figure 8:
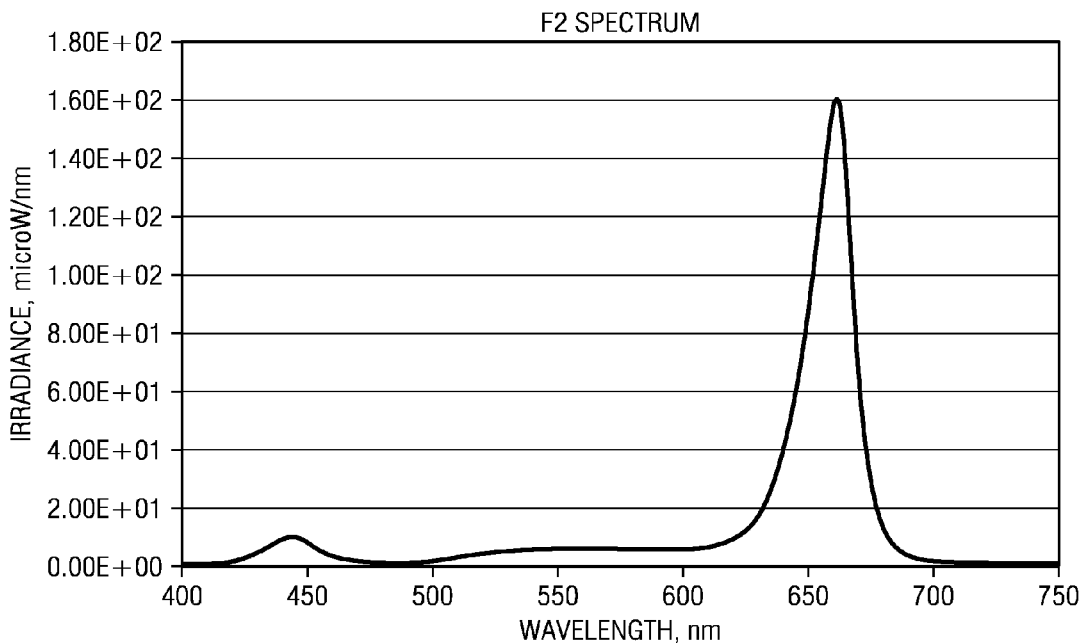

FIG. 8 depicts an example of a spectral distribution similar to that represented in FIG. 4 but with a higher green content and lower blue content (approx. 11% and 5% of the photon flux, correspondingly, with the balance being red light and less than 2% far red). Spectral distributions containing between 10% and 20% green light have been found to be particularly good for the growth of lettuce and tobacco. In them, the preferable amount of blue light is between 5% and 30%. According to one embodiment, the emission spectrum of FIG. 8 can be generated using a ratio of 1 row of blue LEDs coated with phosphor to add green and 3 rows of LEDs emitting light having an emission peak in the red region (e.g., 660 nm+/−25 nm).

Figure 9:
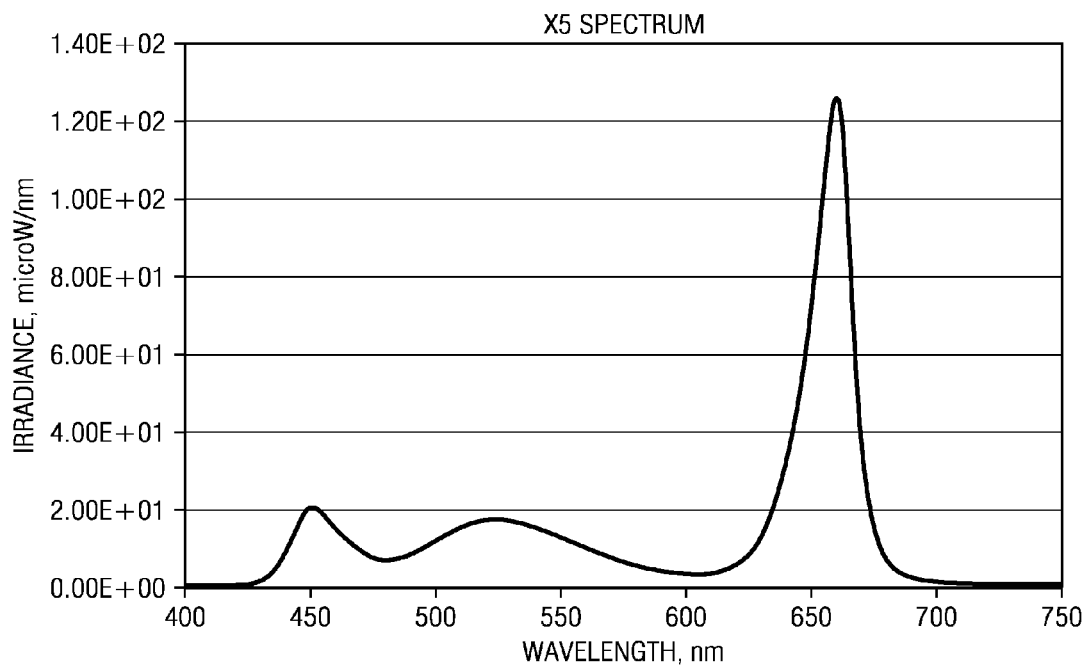

Another example of a spectral distribution with an even higher amount of green light (20-30% of the photon flux) and 10-30% blue light, with the balance red light and less than 2% far red is shown in FIG. 9. According to one embodiment the spectrum of FIG. 9 can be generated using a ratio of 2 rows of blue light LED chips coated with phosphor to add the appropriate amount of green (e.g., a greenish cool white LED) and 2 rows 660 nm+/−25 nm red LEDs. Such spectra have been shown to enhance the growth of lettuce.

In some cases, it may be desirable to supplement existing spectra with supplemental light at particular wavelengths selected to stimulate particular biological processes. FIGS. 10-13 depict example embodiments of supplemental emission spectrum with single emission peaks.

Figure 10:
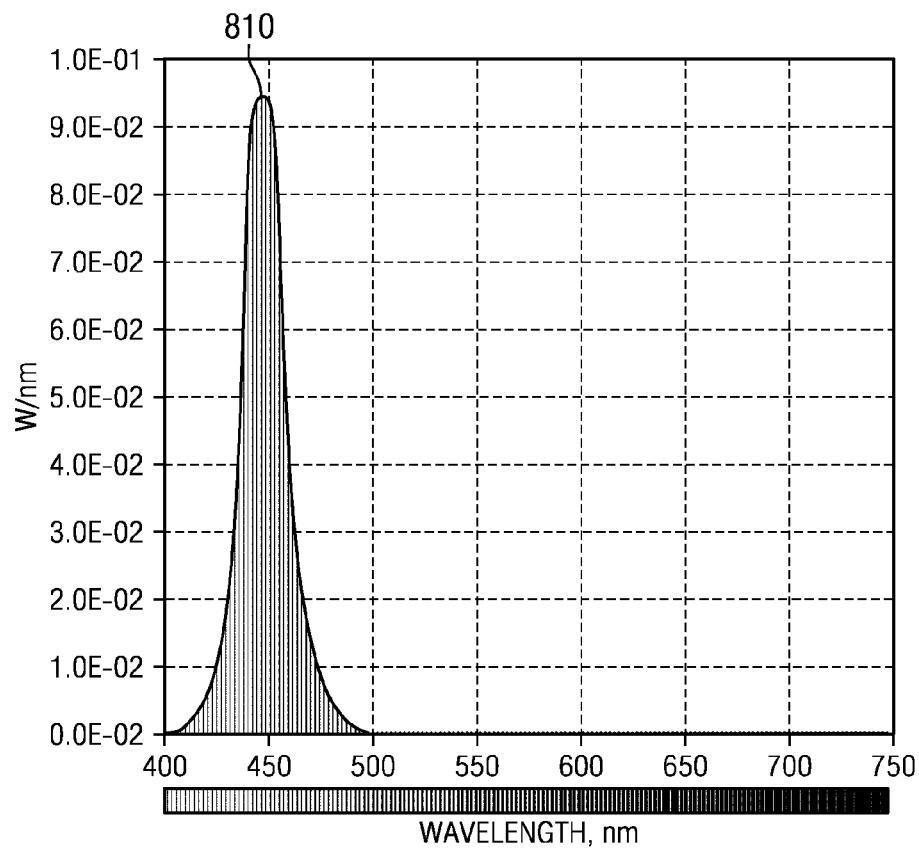
FIGS. 10-13 are diagrammatic representations of different embodiments of emission spectra with one emission peak.

In FIG. 10, supplemental emission spectrum 800 may have a single emission peak 810 at 450 nm+/−25 nm. The single emission peak 810 in the blue region may enact regulation by biological plant components, such as cryptochromes and phototrophins, mediating various plant responses, such as phototropic curvature, inhibition of elongation growth, chloroplast movement, stomatal opening and seeding growth regulation. This light may be directly absorbed by chlorophyll in photosynthesis. This may be useful for seedlings and young plants during the vegetative stage of their growth cycle, especially when plant "stretching" must be reduced or eliminated. Plant stretching is said to occur when a plant is increasing disproportionally in height compared to plants of similar weight from the same cultivar grown outdoors.

Figure 11:
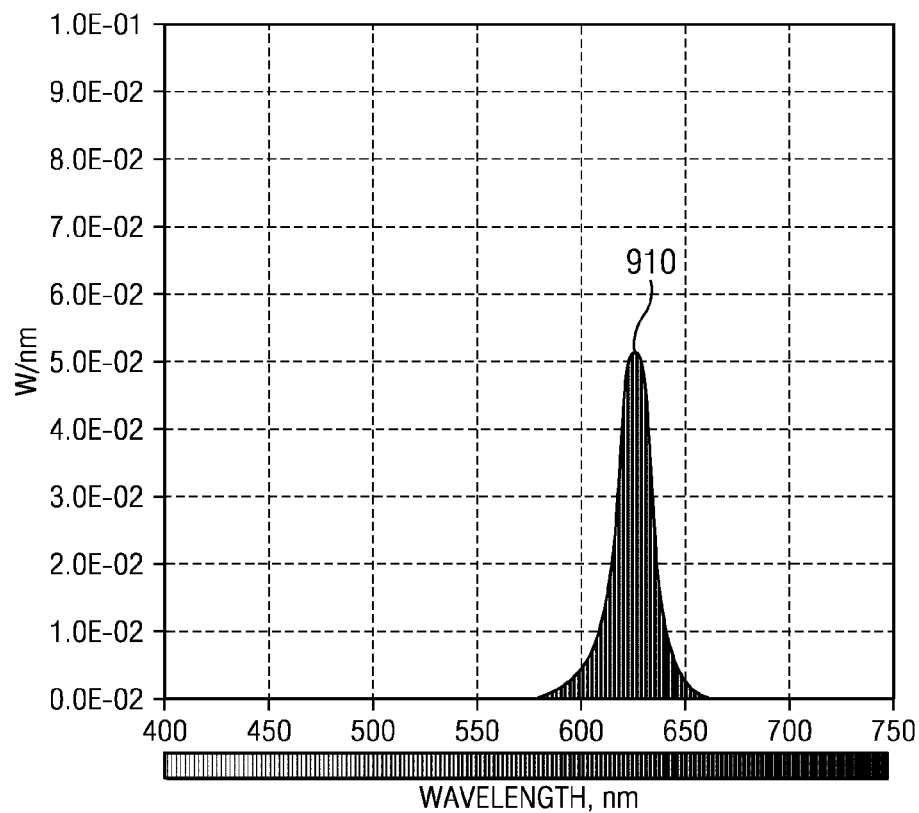

FIG. 11 depicts another example embodiment of a supplemental emission spectrum 900. In this example, there is a single emission peak 910 that may occur at approximately 624 nm+/−25 nm. In this embodiment, peak 910 in the red region may have an advantageous photosynthetic relative quantum yield for a range of plants. Furthermore, in this example, the action on red-absorbing phytochrome may be weaker compared to that of 660 nm of "red" light and can be used to balance the phytochrome equilibrium towards lower values, such as those closer to those of daylight.

Figure 12:
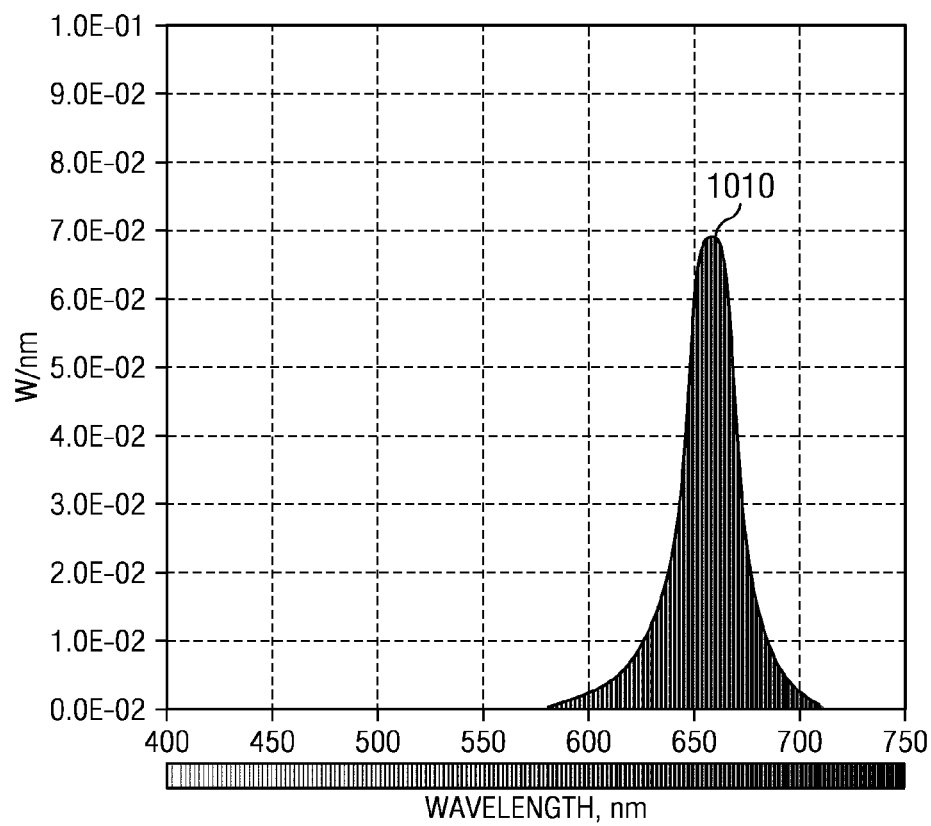

FIG. 12 depicts an embodiment of a supplemental emission spectrum 1000. In this example, a single emission peak 1010 may occur at around 660 nm+/−25 nm within the red region. Spectrum 1000 may have strong photosynthetic action and may also exhibit high action on red absorbing phytochrome regulated germination, flowering and other processes. Supplemental spectra 1000 may be effective for light cycle extension or night interruption to induce flowering of long-day plants or prevent flowering of short-day plants. In general, long day plants may require less than a certain number of hours of darkness in each 24-hour period to induce flowering. On the other hand, short day plants typically flower when the night is longer than a critical length. The embodiment disclosed herein may be an energy-efficient source for photosynthesis among all available supplemental LEDs.

Figure 13:
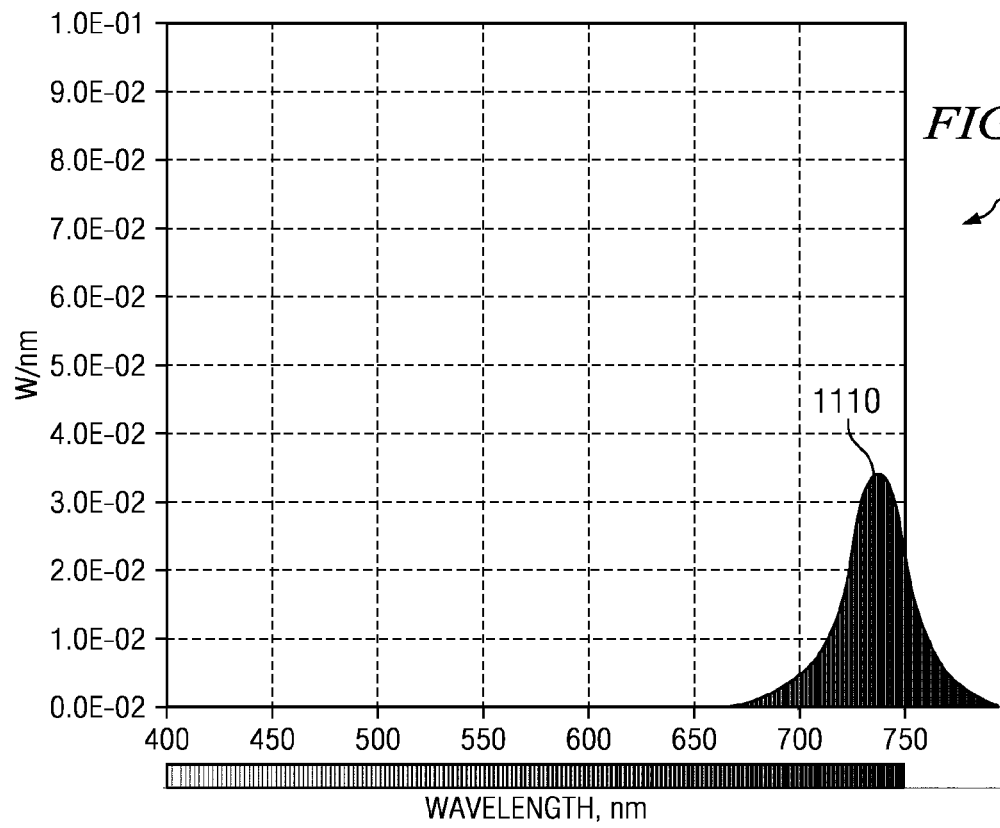

FIG. 13 depicts a supplemental emission spectrum 1100. In this example, spectrum 1100 may have a single emission peak 1110 that occurs at approximately 730 nm+/−25 nm within the "deep red" region. Although this spectrum may be outside the photosynthetically active range, it may have strong action on the far-red absorbing form of phytochrome, converting it back to the red-absorbing form. The spectrum of FIG. 13 may be useful for plants requiring relatively low values of the phytochrome photoequilibrium to flower. This example supplemental spectrum can be used at the end of each light cycle to promote flowering in short-day plants.

The preceding spectra are provided by way of example, but not limitation and a variety of spectra can be provided. The spectrum provided can depend, in some embodiments, on the plant being stimulated. Furthermore, the spectrum may be altered dynamically over time (e.g., over the course of a day, month, year) to better stimulate the plant during a growth cycle. Further, it can be noted that various spectra can be provided where a majority of the irradiance falls below 600 nm (e.g., in the blue, green or blue and green regions), above 700 nm (e.g., in the far red region) or otherwise outside of the red region (e.g., in the blue, green and/or far red regions). Furthermore, spectra can be provided with two, three, four or more emission peaks. Preferably, there is a single emission peak per region.

Figure 14:
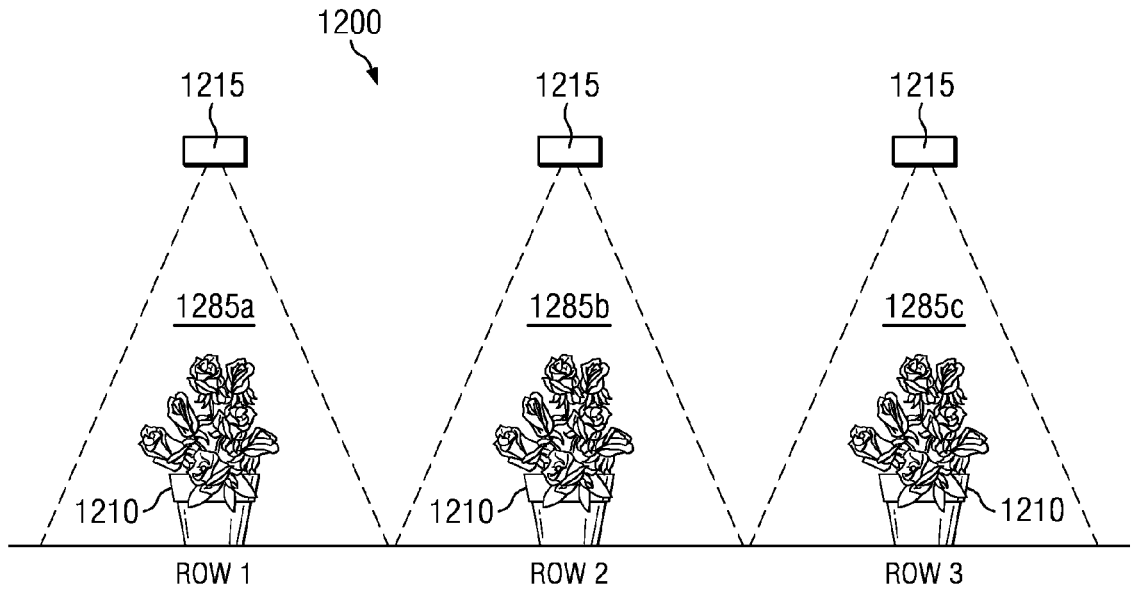
FIG. 14 is a diagrammatic representation of light bars illuminating plants.

As discussed above, various spectra of light can be provided to plants to stimulate various biological processes. Preferably, the various spectra can be provided using LED lights. Accordingly, an example embodiment of a system for providing light to plants is provided. FIG. 14 is a diagrammatic representation of an embodiment of a system in which parallel light bars 1215 are arranged to provide light to plants 1210. While only one row of plants 1210 is illustrated for each light bar 1215, there may be multiple rows illuminated by multiple light bars. In the embodiment of FIG. 14, each light bar 1215 comprises packaged LEDs. The illumination pattern provided by each packaged LED results from the blended light of each color channel. Each packaged LED 1350 (not shown) can therefore provide a controlled light area 1285 without requiring multiple parallel light bars.

The arrangement of FIG. 14 can lead to significant vertical and horizontal space savings, facilitating a larger yield per area/volume of growing space. This may be particularly useful in vertical farming applications where there is limited space for plant growth. Additional space savings can be realized if controlled light areas 1285a, 1285b and 1285c have the same color profile because there will be little or no effect from overlapping the illumination patterns of parallel light bars 1215. Such an arrangement may provide for maximum color blending.

In addition to the advantage of space saving, the arrangement of FIG. 14 can also allow for a favorable amount of delivered photosynthetic photon flux density (PPFD) in a cost effective manner. For example, by utilizing fewer light bars to optimally illuminate the same number of plants by delivering a desired amount of photons for plants may allow for cost effectiveness in the dollar per delivered photon for plants illuminated. PPFD may be a measure of the number of photons falling on a measured square area per second. PPFD may be a measure of photosynthetically available radiation (PAR). PAR is a spectral range of radiation that photosynthetic organisms are able to use in the process of photosynthesis. Generally, this spectral range corresponds to the range of visible light (400 nm to 700 nm). Having an optimal amount PPFD for a target area is advantageous as light not delivered to a plant may be wasted. Controlled light areas 1285a-c may ensure that target plants 1210 receive the maximum amount of light with minimal wastage. The embodiment of FIG. 14 may allow for the usage of fewer lights with an optimal amount of PPFD to reach a plant target area thereby consuming less energy for advantageous lighting.

Figure 15:
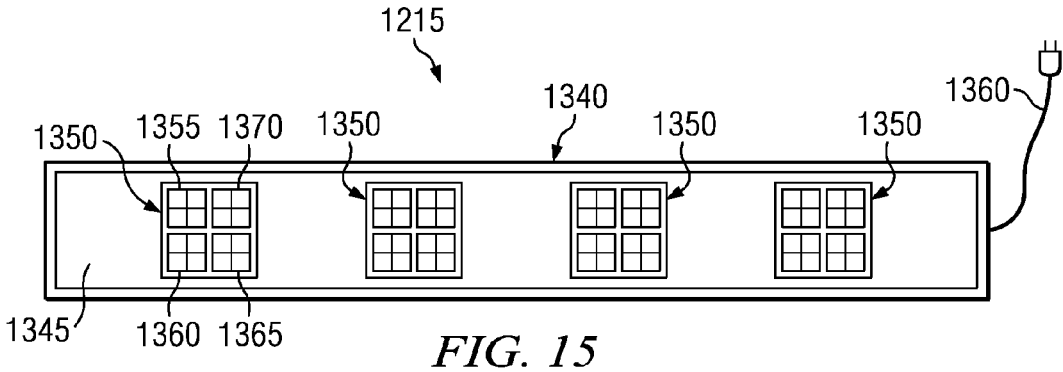
FIG. 15 illustrates one embodiment of a light bar.

FIG. 15 is a diagrammatic representation of one embodiment of light bar 1215 comprising a light bar frame 1340 defining a light source holding area 1345 in which is arranged a set of spaced packaged light sources 1350. The light bar frame 1340 can be made of any suitable material or combination of materials. One example is extruded aluminum. Light bar 1215 can have any suitable dimension, but preferably has a cross-sectional dimensions of about 1"×2" to 2"×4" and a length between 6" and 96".

The space between packaged light sources 1350 may be filled with a potting material. Light bar 1215 can include a connection 1360 including any necessary power and data connections. Light bar 1215 can include features to prevent environmental damage. As a couple of examples, the potting material and connection 1360 can be IP66 or higher to provide adequate dust and water incursion protection.

Each packaged light source 1350 (a "packaged LED") may include one or more LEDs. In the embodiment of FIG. 15, each packaged LED 1350 includes sixteen optical devices, each including an LED with corresponding primary optical device. The LEDs, phosphors or other components can be selected to generate a desired spectrum. Using the example of a packaged array with sixteen LEDs, the spectrum of FIG. 1 can be achieved using four blue LEDs and twelve red LEDs, the spectrum of FIG. 2 can be achieved using twelve blue LEDs and four red LEDs, the spectrum of FIG. 3 may be achieved using eight blue LEDs and eight red LEDs. As another example, the spectrum of FIG. 4 may be achieved using four blue LEDs and twelve red LEDs, along with a phosphor, such as yttrium-aluminum-garnet doped with $Ce^{3+}$ (YAG:Ce) to produce 8-10% green light. In one embodiment, each packaged LED array 1350 may be configured to generate light to a particular spectrum. According to another embodiment, packaged LEDs in the same light bar 1215 can correspond to different spectra.

In yet another embodiment, a single package can support multiple spectra. To provide an example, a packaged LED having sixteen optical devices may include four color channels 1355, 1360, 1365 and 1370. By way of example, but not limitation, the group of optical devices 1355 may emit light corresponding to a "far red" spectrum, group of optical devices 1360 may emit light corresponding to a "green" spectra, group of optical devices 1365 may emit light corresponding to a "red" spectrum and group of optical devices 1370 may emit light corresponding to a "blue" spectrum. In this case, a single light bar can be used to provide multiple spectra of light to plants 1210. By controlling each color channel of light, the blended color arriving at the plants 1210 can be controlled.

Figure 16:
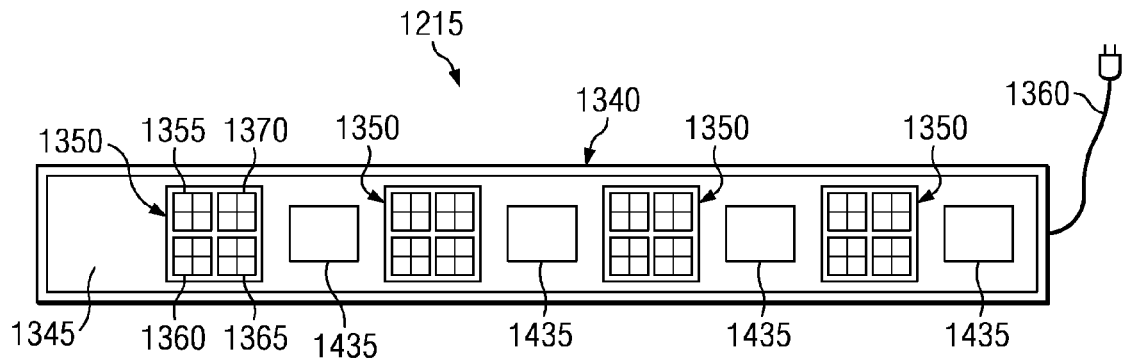
FIG. 16 illustrates another embodiment of a light bar.

In some cases, the control hardware for regulating color channels may be built into a light bar. FIG. 16 is a diagrammatic representation of another embodiment of a light bar 1215 illustrating on-board hardware 1435 placed between packaged LEDs 1350.

Arrays can be selected to combine desired spectral emission with optical beam control so that spectrally uniform light with uniform irradiance may be provided to plants. Preferably, array includes optical devices that emit light with a controlled beam angle of less than 120 degrees, preferably less than 90 degrees and even more preferably less than 60 degrees (e.g., a half angle of less than 60 degrees, preferably less than 45 degrees and even more preferably less than 30 degrees). Therefore, according to one embodiment, the packaged light sources can be formed as described in U.S. patent application Ser. No. 61/319,739 entitled "System and Method for Phosphor Coated Lens" by Ko et al., filed Mar. 31, 2010, U.S. patent application Ser. No. 12/646,570 entitled "System and Method for a Phosphor Coated Lens" by Ko et al., filed Dec. 23, 2009, U.S. Provisional Patent No. 61/235,491 entitled "Phosphor Coated Lens for Phosphor Converting Type White Light Engine" by Ko et al., filed Aug. 11, 2009, and U.S. patent application Ser. No. 13/077,594 entitled "System and Method for Color Mixing Lens Array," filed Mar. 31, 2011, each of which are hereby fully incorporated by reference herein. Example light sources include, but are not limited to, Aduro, Surexi, and Abeo LEDs by Illumitex Inc., of Austin Tex. Preferably, the optical devices of the packaged LED are adapted to emit light in a controlled beam angle with a high percent light in beam (e.g., greater than 50%, greater than 60%, greater than 70% to greater than 90% and approaching 100%) in a range of beam angles (e.g., 20-120 degrees (full width at half maximum)).

Thus, embodiments as depicted in FIG. 15 and FIG. 16 may include controlled spectral distribution and narrow beam angles for the efficient application of light for optimal plant growth. Embodiments may utilize narrow beam angles to provide for a favorable amount of photons delivered to a target plant to ensure less wastage of light energy to a plant. Furthermore, by controlling spectral distribution, embodiments disclosed herein provide for advantageous color blending that encourages positive plant growth. By utilizing both narrow beam angles for high photon distribution and controlled spectral distribution, embodiments disclosed herein provide for an advantageous platform in facilitating plant growth.

Figure 17:
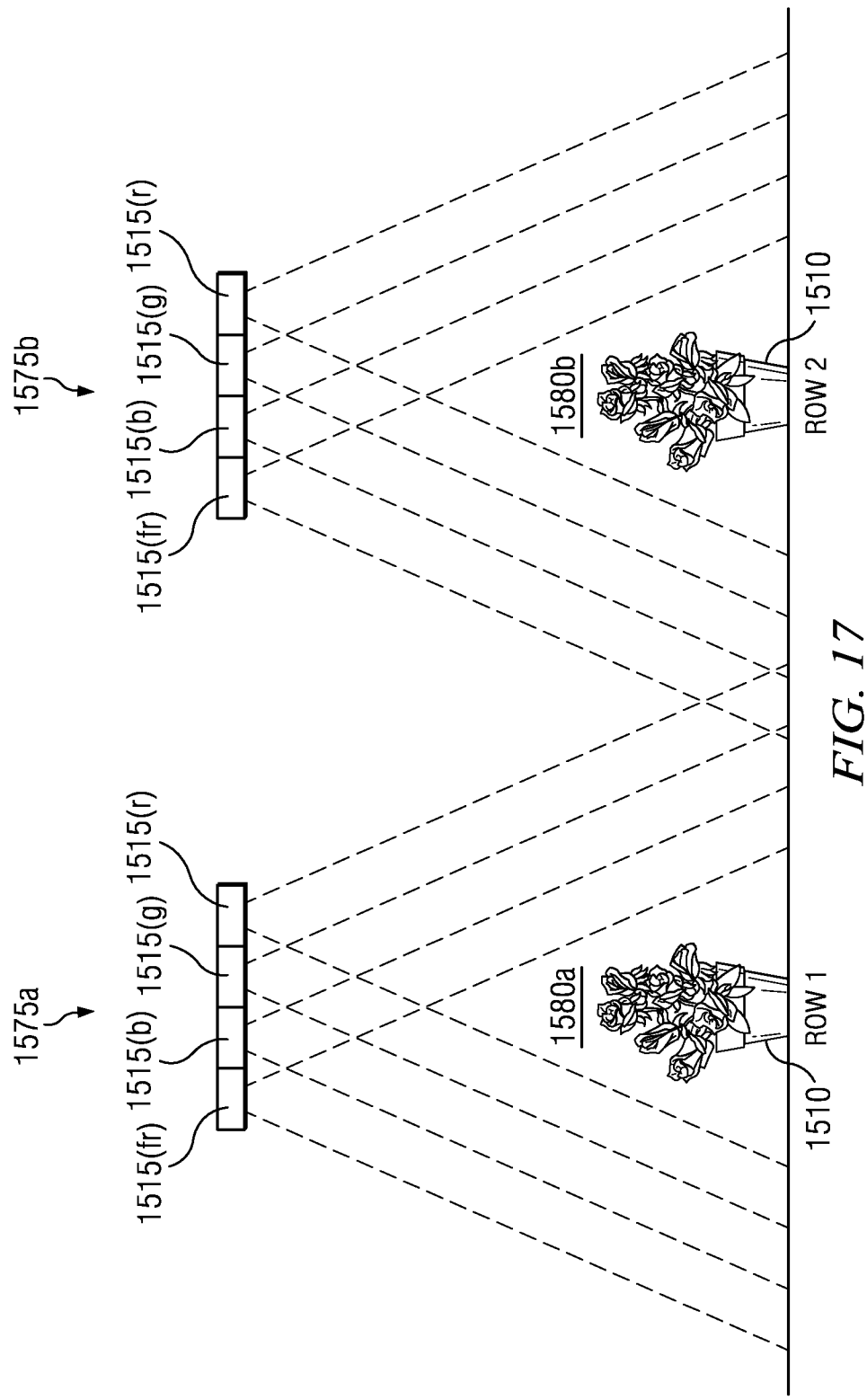
FIG. 17 is a diagrammatic representation of light bars illuminating plants.

In the above example, a single packaged array can be used to create a desired spectrum of light. In another example, light from multiple packaged arrays is blended to achieve a desired spectrum. FIG. 17, for example, discloses an alternative embodiment of a plant lighting system. In this example, each light bar 1515 may generate light having a different peak emission wavelength (e.g., in the red region as represented by 1515(r), the blue region as represented by 1515(b), the far red region as represented by 1515(fr) and the green region as represented by 1515(g). A system with groups (group 1575a and 1575b) of parallel light bars 1515 can be arranged to provide light to adjacent rows of plants 1510. The illumination patterns from each of light bars 1515 overlaps in a respective controlled light area 1580 with the spectral distribution in controlled light area 1580 (i.e., the color of light provided to plants 1510) resulting from the amount of light provided by each light bar in the corresponding light bar group 1575.

In one embodiment, controlled light area 1580 may emit a customized spectrum sought for controlled plant growth. Consequently, light bars may be spaced so that while the light from light bars within a group overlaps at the target plane (i.e., the plants 1510), it does not overlap (or minimally overlaps) the controlled light 1580 provided by an adjacent group of light bars. So that the light provided to each row of plants is accurately controlled, it is preferable that the light from the first row of light bars does not overlap the controlled light area 1580 provided by the second row of light bars. That is, it is preferable that the light provided by group 1575a does not overlap with controlled light area 1580b and vice versa. In other embodiments, light from various groups of light bars may overlap in the plant illumination area.

Figure 18:
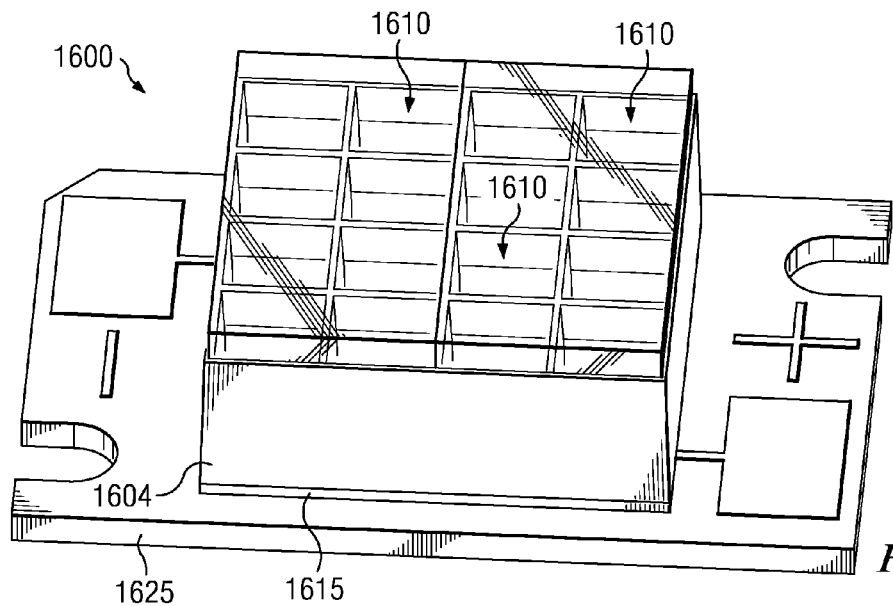
FIG. 18 is a diagrammatic representation of one embodiment of a packaged array.

FIG. 18 is a diagrammatic representation of one embodiment of a packaged array 1600 that can achieve controlled beam angles and highly uniform light output. In the embodiment of FIG. 18, packaged array 1600 comprises submount 1625, main housing 1604 and a lens array. Submount 1625 provides mechanical support and electrical connections for LEDs. Embodiments of submount materials include, but are not limited to: Low Temperature Cofire Ceramic (LTCC) with thermal vias, High Temperature Cofire Ceramic (HTCC) with thermal vias, Beryllium Oxide (BeO) ceramic, Alumina ceramic, Silicon, Aluminum Nitride (AlN), Metal (Cu, Al, etc.), and Flex circuit.

Main housing 1604 can be formed of suitable materials including, but are not limited to, plastic, thermoplastic, and other types of polymeric materials. Composite materials or other engineered materials may also be used. In some embodiments, main housing 1604 may be made by a plastic injection molding manufacturing process. Various molding processes and other types of manufacturing processes may also be used. In some embodiments, main housing 1604 may be opaque. In some embodiments, main housing 1604 may be transparent or semi-transparent. Main housing 1604 can be bonded or otherwise coupled to a layer of material 1615 to complete the housing about the LEDs and lenses. In other embodiments, the housing can be formed of any number of layers or pieces of suitable material that will not unacceptably deform during operation due to heating and can protect the LEDs and lens for expected contact or shock during use, transportation or manufacture.

In the embodiment of FIG. 18, packaged array 1600 is a 4×4 array and each group of 4 lenses shares a portion 1610 integrated with the lenses. Portion 1610 can act as a connecting member to connect the lenses into a single array and a cover to protect the lenses. In other embodiments a single cover can be used for all lenses or each lens can have its own cover. Portion 1610, according to one embodiment, can have a sufficient thickness to prevent the lenses from becoming damaged during handling of packaged array 1600.

Figure 19:
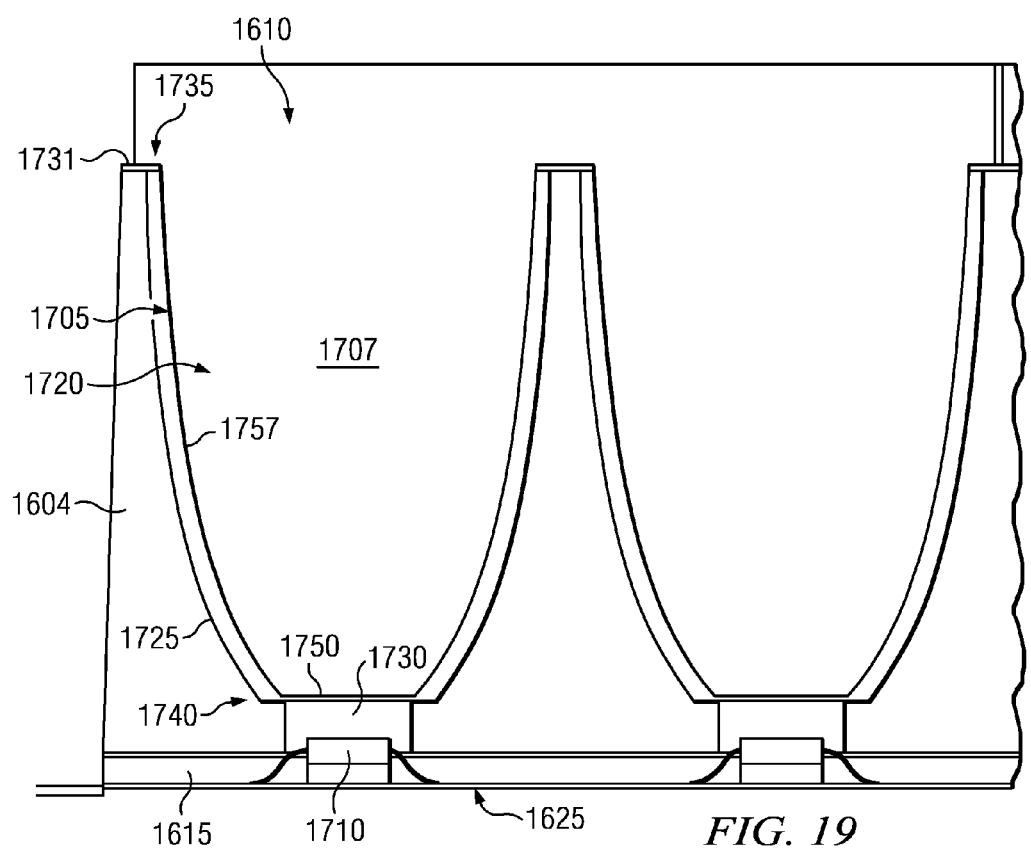
FIG. 19 is a diagrammatic representation of a cross-section of an embodiment of a packaged array.

FIG. 19 is a diagrammatic representation of a cross-sectional view of one embodiment of packaged array 1600 illustrating main housing 1604, lens 1705, portion 1610, LED 1710, LED cavity 1730, housing layer 1615 and submount 1625 (only one instance of each is indicated for clarity). In the embodiment of FIG. 19, portion 1610 is integrated with lens 1705 such that they form a single lens assembly. Portion 1610 can be integrated with other lenses 1705 so that a single lens assembly will have a connecting portion and multiple lens portions. The body 1707 of lens 1705 and portion 1610 can be made of a single piece of molded plastic, polycarbonate, PMMI or other material. In other embodiments, portion 1610 can be coupled to lens 1705 using an adhesive. Portion 1610 also may simply be in contact with lens 1705 or may be separated from lens 1705 by a gap. In other embodiments, the shape of lens body 1707 can be selected to account for the transition into portion 1610.

According to one embodiment, lens 1705 is formed with an entrance face 1750, exit interface from lens body 1707 to portion 1610 and sidewall 1757 shape according to U.S. Pat. No. 7,772,604, which is hereby fully incorporated herein by reference, to emit light in a desired beam angle with a high percent light in beam and to conserve radiance or to otherwise have a high efficiency. By way of example, but not limitation the body portion of lens 1705 can be shaped to conserve radiance or some percentage of radiance (e.g., greater than 50%, greater than 60%, greater than 70% to greater than 90% and approaching 100%). Additionally, the body portion can to achieve a high percent of light in beam (e.g., greater than 50%, greater than 60%, greater than 70% to greater than 90% and approaching 100%) in a range of beam angles (for example, but not limited to full beam angles of 20-120 degrees (full width half maximum)). Because the individual lenses 1705 devices provide a high percent of light in beam, an array of such optical units (e.g., in a packaged array 1600) can also provide a high percentage of light in beam (e.g., greater than 50%, greater than 60%, greater than 70% to greater than 90% and approaching 100%). In addition, the lenses can be selected so that the optical units provide a uniform illumination pattern.

Main housing 1604 forms a lens cavity 1720 sized to fit lens 1705. The sidewalls 1725 of lens cavity 1720 can be curved to match or approximate the sidewall 1757 shapes of lens 1705 so that the size of lens cavity 1720 is smaller proximate to the corresponding LED cavity 1730 and larger distal from LED cavity 1730. In other embodiments, the sidewalls 1725 can be vertically straight (from the perspective of FIG. 19) or can be tapered. Sidewalls 1725 can include reflective coatings or other coatings to reflect any light leaking from the sides of lens 1705 to the exit of the lens assembly.

In another embodiment, main housing 1604 can be formed of white plastic or other color material so that sidewalls 11725 form reflectors.

According to one embodiment, lens cavity 1720 can be sized so that there is a gap between the sidewalls of lens body 1707 and sidewalls 1725 of lens cavity 1720 to preserve TIR in lens body 1707. The size of the gap can be constant or can increase or decrease further from the base of lens cavity 1720. The gap can be filled with air or other material. Preferably, the material has a lower index of refraction than body 1707 of lens 1705. In other embodiments, sidewalls 1725 can contact that sidewalls of lens body 1707 and act as a reflector for light in lens body 1707.

Main housing 1604 can include a shoulder 1731 on which ledge 1735 of portion 1610 rests. An adhesive, mechanical fasteners or other suitable fastening mechanism can be used to couple portion 1610 to main housing 1604. In other embodiments a secondary structure, such as a clamping structure, can maintain cover 1610 against main housing 1604.

According to one embodiment, by coupling portion 1610 to main housing 1604, lens 1705 is held in a desired position in lens cavity 1720. In this case, lens 1705 may not require additional attachment to housing 1604. In other embodiments, a portion of lens 1705 can be adhered to or otherwise coupled to a shoulder 1740 at the base of lens cavity 1720 or other portion(s) of lens 1705 can be coupled to main housing 1604.

Main housing 1604 defines a portion or all of LED cavity 1730 in cooperation with submount 1625 and housing layer 1615. Although LED cavity 1730 is shown with vertical sidewalls, LED cavity 1730 can have tapered, curved or otherwise shaped sidewalls to act as a redirector lens. The opening to LED cavity 1730 can have the same shape as and be rotationally aligned with LED 1710 or can have another shape or alignment.

A phosphor layer can be disposed proximate to entrance face 1750 such that light exiting LED cavity 1730 will be incident on the phosphor layer. The phosphor layer down converts light before the light enters lens body 1707. The down converted light is guided through lens 1705 and exits portion 1610. Entrance face 1750 of lens body 1707 can be the same shape as and be rotationally aligned with the opening to LED cavity 1730 or have another shape or alignment.

Figure 20:
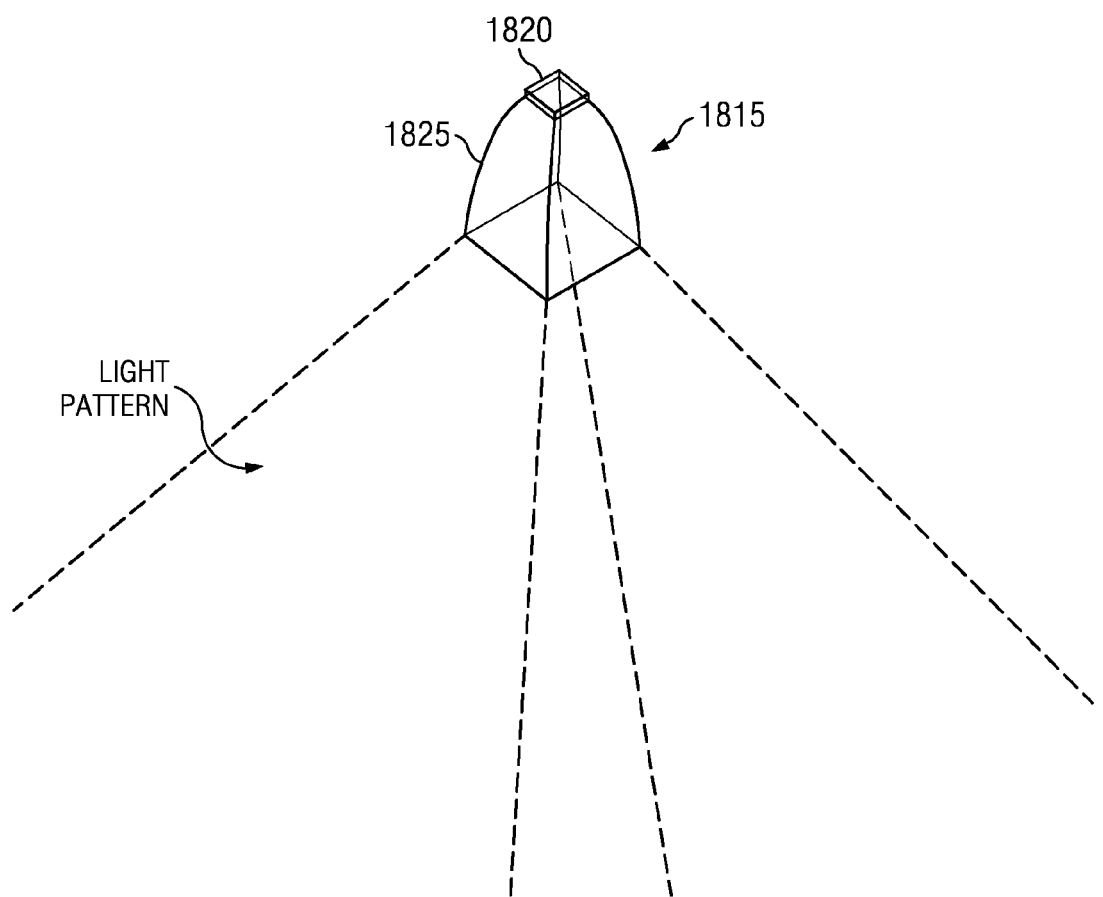
FIG. 20 is a diagrammatic representation showing an optical unit with a 30 degree half-angle.
Figure 21:
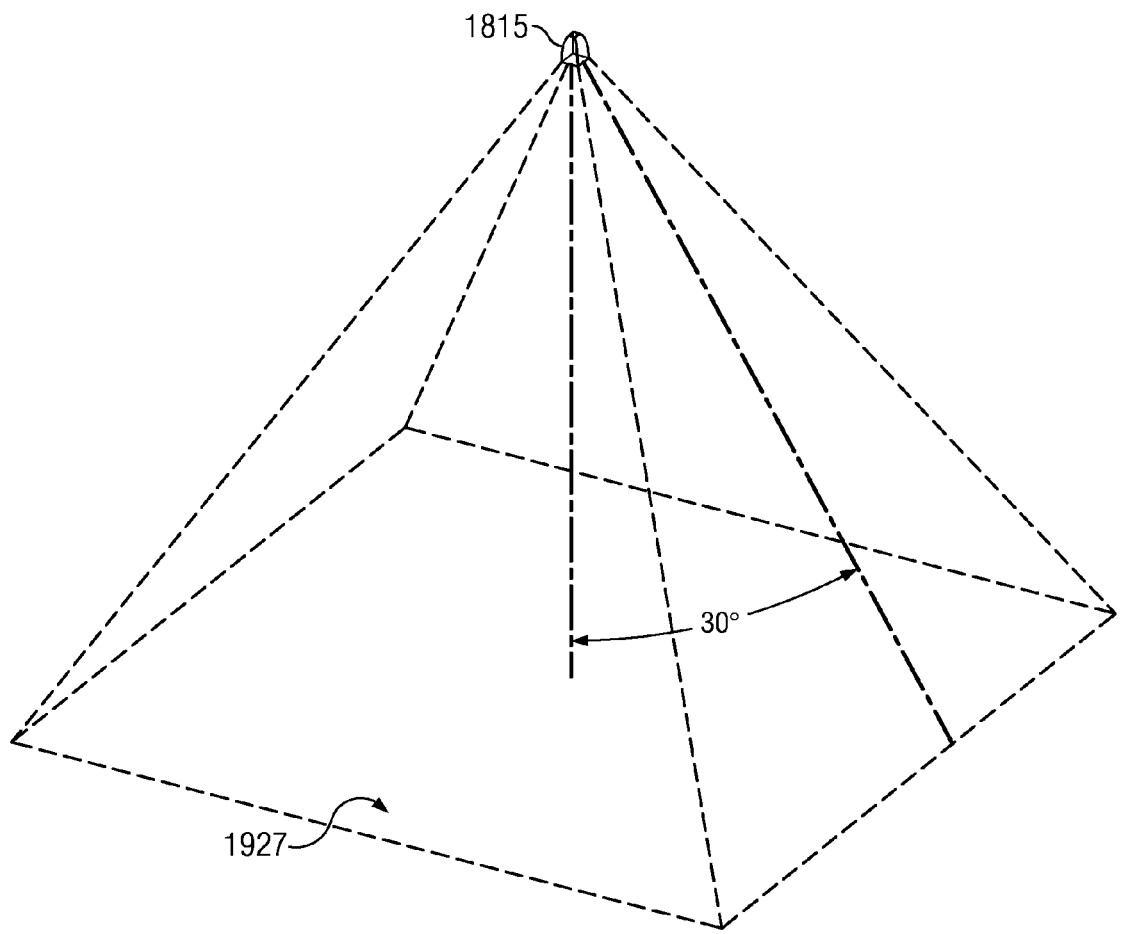
FIG. 21 is another diagrammatic representation showing an optical unit with a 30 degree half-angle.
Figure 22:
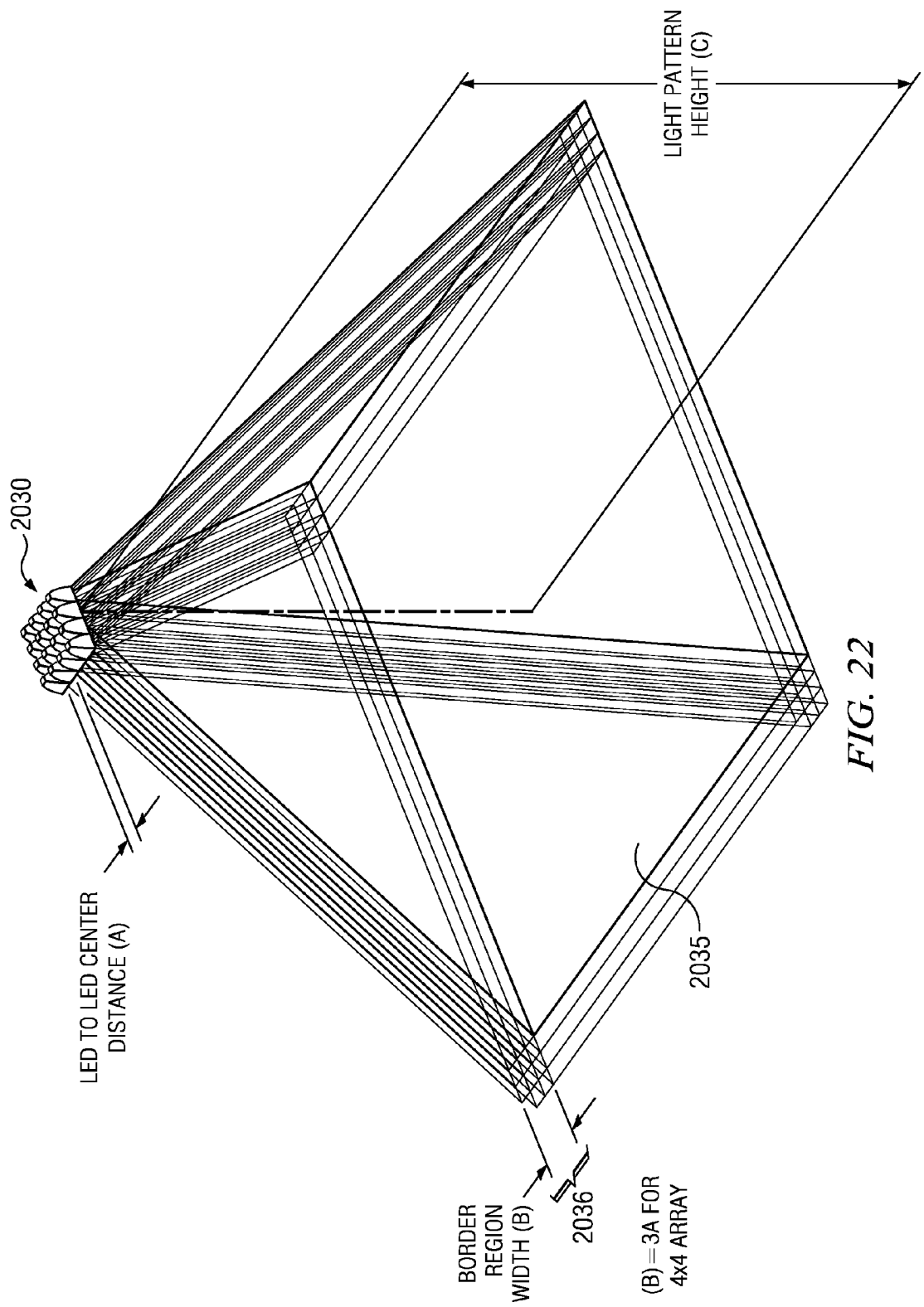
FIG. 22 is a diagrammatic representation of an array of optical units and a resulting light pattern.

The ability to create desired spectra using an optical device with controlled beam angle is discussed further with respect to FIGS. 20-22. FIG. 20 illustrates an optical device 1815 with controlled beam angle. According to one embodiment, optical unit 1815 may comprise LED and separate optical device combination as described in U.S. Pat. No. 7,772,604, which is fully incorporated by reference herein. Optical units can use lenses, shaped substrates or shaped emitter layers that conserve radiance or some percentage of radiance (e.g., greater than 50%, greater than 60%, greater than 70% to greater than 90% and approaching 100%). Additionally, optical units can be selected to achieve a high percent of light in beam (e.g., greater than 50%, greater than 60%, greater than 70% to greeter than 90% and approaching 100%) in a range of beam angles (for example, but not limited to full beam angles of 10-120 degrees (full width half maximum)). Because the individual optical units provide a high percent of light in beam, an array of such optical units (e.g., in a packaged array 1350) can also provide a high percentage of light in beam (e.g., greater than 50%, greater than 60%, greater than 70% to greater than 90% and approaching 100%). In addition, the optical units can be selected so that the optical units provide a uniform illumination pattern.

For purposes of discussion, optical unit 1815 can include LED 1820 (or an array of LEDs) and lens 1825. Light from LED 1820 optionally can be down converted by phosphor. If phosphor is used, the phosphor coating may be disposed on lens 1825, LED 1820 or otherwise disposed between LED 1820 and the entrance to the body of lens 1825. Lens 1825 can be constructed to emit light in a uniform distribution pattern with either a sharp or soft cut off angle with a high extraction efficiency and percentage of light in beam.

FIG. 21 is a diagrammatic representation of the illumination pattern of the unit 1815 with a target surface 1927 being a substantial distance away compared to the size of the unit 1815 (in this example approximately 20:1). At a distance that is 20 times the size of the lens exit face the lighted field dimension will be 20*2*tan(30)=23 times as wide as the exit face. At this distance the pattern is uniform with well-defined edges.

FIG. 22 illustrates an array 2030 of optical units 1815 that may be utilized for plant growth. When one unit is placed next to another, it will have the same field size as the first unit (assuming similar geometries), but the field will be displaced only by the width of the lens exit face (assuming the lenses are closely packed so that there is little or no distance between adjacent lenses). The effect of this is that the optical units 1815 emit an overall light profile having an i) overlapping illuminated area 2035 illuminated with a mix of chromaticities providing an area of very uniform illumination and ii) a less uniform border area 2036.

As the distance between the illuminated surface and array 2030 grows, the illuminated area grows while the width of the border area 2036 stays the same size. At far field, border area 2036 becomes unnoticeable. Multiple arrays can be arranged such the border areas overlap to create more uniformity in the border areas, leading to a larger illuminated area having a uniform profile. Due to the square or rectangular shape of the illuminated area created by the array 2030, multiple arrays can be spaced at desired distances to provide targeted uniform lighting over large areas. Providing uniform light can especially important when trying to provide for an optimal amount of light for a target plants in an area.

The color of the overlap area 2035 can depend on the color emitted by each lens which, in turn, can depend on the LED and phosphor selected. According to one embodiment, each LED can be a blue or ultraviolet LED used in conjunction with a pure phosphor or blend of phosphors so that the corresponding lens emits a desired color light. In other embodiments, some or all of the LEDs selected may emit a desired color light without using a phosphor coating. Thus, for example, some of the LEDs in the array can be blue or ultraviolet (or other color) LEDs used in conjunction with phosphors while other LEDs can be red (or other color) LEDs used without phosphors. Examples of phosphors that can be used include, but are not limited to: garnets doped with $Ce^{3+}$ (such as $Y_3Al_5O_{12}$:Ce, or YAG), silicates doped with $Eu^{2+}$ (such as $(MgSrBa)_2SiO_4$:Eu, or BOS), nitrides doped with $Eu^{2+}$ (such as $(MgCaSr)AlSiN_3$:Eu), and other suitable materials known in the art.

An advantage of using an array of units is the ability to provide "hybrid" solutions with narrow beam angles in which some lenses are coated with phosphor and others are not. For example, one embodiment of an array can use blue or ultraviolet LEDs in conjunction with green-yellow phosphor (such as YAG or BOS) on one set of units, and red LEDs, without phosphor, in another set of units.

According to one embodiment, the phosphors can be selected and LEDs controlled so that the combined output in overlap area 2035 has a desired spectral power distribution and color coordinates to achieve desired x and y values in the 1931 CIE chromaticity diagram. By using units emitting various colors (with or without phosphor added), one can achieve dynamic color control of the light (e.g. by using an RGB approach), or a dynamic white light changing from warm to neutral to cool (and back if necessary) over the course of the day, as a few examples. The use of optical units constructed to emit uniform light in a controlled beam angle allows for excellent color mixing/blending (with no diffuser-associated losses) and superior beam angle control at the same time. This is particularly useful in providing optimal conditions for maximal plant growth.

Furthermore, the use of an array of LEDs that can be controlled to emit light having various emission spectrums allows the use of a single type of array to provide an optimal emission spectrum for a particular type of plant. For example, a user can use the same lighting system to provide the optimal spectrum for lettuce growth or for tomato growth. The user may simply select the emission spectrum for the particular type of plant being illuminated.

While this disclosure describes particular embodiments, it should be understood that the embodiments are illustrative and that the scope of the invention is not limited to these embodiments. Many variations, modifications, additions and improvements to the embodiments described above are possible. For example, the various ranges and dimensions provided are provided by way of example and LEDs and lenses may be operable within other ranges using other dimensions. It is contemplated that these variations, modifications, additions and improvements fall within the scope of the claims.

What is claimed:

1. A system for plant growth comprising:
a first LED device configured to emit light of a first color, wherein the first LED device is configured to emit light with a controlled beam half angle of less than or equal to 60 degrees and at least 50% of the light emitted by the first LED is in the controlled beam half angle of the first LED and at least 70% of the light emitted by the first LED is in the field angle of the first LED; and
a second LED device configured to emit light of a second color, wherein the second LED device is configured to emit light with a controlled beam half angle of less than or equal to 60 degrees and at least 50% of the light emitted by the second LED is in the controlled beam half angle of the second LED and at least 70% of the light emitted by the second LED is in the field angle of the second LED; and wherein the system is configured to generate an emission spectrum having a first emission peak below 500 nm and a second emission peak above 600 nm.

2. The system of claim 1, wherein the first emission peak is at 425-475 nm, and a second emission peak is at 635-685 nm.

3. The system of claim 1, wherein the system is configured to have a third emission peak at 500-600 nm.

4. The system of claim 3, wherein the photon flux of the emission spectrum contains between 5% and 10% green light.

5. The system of claim 4, wherein the photon flux of the emission spectrum contains between 5% and 30% blue light.

6. The system of claim 3, wherein the photon flux of the emission spectrum contains between 10% and 20% green light.

7. The system of claim 6, wherein the photon flux of the emission spectrum contains between 5% and 30% blue light.

8. The system of claim 3, wherein the photon flux of the emission spectrum contains between 20% and 30% green light.

9. The system of claim 8, wherein the photon flux of the emission spectrum contains between 5% and 30% blue light.

10. The system of claim 1, wherein the emission spectrum has at least one emission peak in each of the blue, green and red regions.

11. The system of claim 1, wherein the emission spectrum has emission peaks within at least three color regions.

12. The system of claim 1, wherein the emission spectrum has emission peaks within at least four color regions.

13. A method of illuminating plants comprising: providing a first LED device configured to emit light of a first color, wherein the first LED device is configured to emit light with a controlled beam half angle of less than or equal to 60 degrees and at least 50% of the light emitted by the first LED is in the controlled beam half angle of the first LED and at least 70% of the light emitted by the first LED is in the field angle of the first LED; and providing a second LED device configured to emit light of a second color, wherein the second LED device is configured to emit light with a controlled beam half angle of less than or equal to 60 degree and at least 50% of the light emitted by the second LED is in the controlled beam half angle of the second LED and at least 70% of the light emitted by the second LED is in the field angle of the second LED; and illuminating plants using the system to generate an emission spectrum having a first emission peak below 500 nm and a second emission peak above 600 nm.

14. The method of claim 13, wherein the first emission peak is at 420 nm to 470 nm, and a second emission peak is at 635 nm to 685 nm.

15. The method of claim 13, wherein the system is configured to have a third emission peak at 500-600 nm.

16. The method of claim 15, wherein the photon flux of the emission spectrum contains between 5% and 10% green light.

17. The method of claim 16, wherein the photon flux of the emission spectrum contains between 5% and 30% blue light.

18. The method of claim 15, wherein the photon flux of the emission spectrum contains between 10% and 20% green light.

19. The method of claim 18, wherein the photon flux of the emission spectrum contains between 5% and 30% blue light.

20. The method of claim 15, wherein the photon flux of the emission spectrum contains between 20% and 30% green light.

21. The method of claim 20, wherein the photon flux of the emission spectrum contains between 5% and 30% blue light.

22. The method of claim 13, further comprising dynamically changing the emission spectrum.

23. The method of claim 13, wherein the emission spectrum has emission peaks within at least three color regions.

24. The method of claim 13, wherein the emission spectrum has emission peaks within at least four color regions.

25. The method of claim 13, wherein the system is operable to generate multiple spectra and the method further comprises selecting the emission spectrum for a particular type of plant being illuminated.

26. A method of illuminating plants comprising: providing a first LED device configured to emit light of a first color; providing a second LED device configured to emit light of a second color wherein at least 50% of the light emitted by the first LED and the second LED is in the controlled beam half angle of the first LED and the second LED and at least 70% of the light emitted by the first LED and the second LED is in the field angle of the first LED and the second LED; and illuminating plants using the system to generate an emission spectrum with multiple with emission peaks in at least four color regions and at least one of the emission peaks in at least one of the green region or the uv region.

27. The method of claim 26, wherein the photon flux of the emission spectrum contains between 5% and 10% green light.

28. The method of claim 27, wherein the photon flux of the emission spectrum contains between 5% and 20% blue light.

29. The method of claim 26, wherein the photon flux of the emission spectrum contains between 10% and 20% green light.

30. The method of claim 29, wherein the photon flux of the emission spectrum contains between 5% and 20% blue light.

31. The method of claim 26, wherein the photon flux of the emission spectrum contains between 20% and 30% green light.

32. The method of claim 31, wherein the photon flux of the emission spectrum contains between 5% and 20% blue light.

33. The method of claim 26, further comprising dynamically changing the emission spectrum.

\* \* \* \* \*